United States Patent
Richardson et al.

(10) Patent No.: US 8,954,101 B2
(45) Date of Patent: *Feb. 10, 2015

(54) METHODS AND APPARATUS FOR UPDATING A COMMUNICATIONS DEVICE USING SMS MESSAGES

(75) Inventors: Brian Thomas Richardson, Encinitas, CA (US); Arlene Joy Harris, Del Mar, CA (US); Virginia Ellen Beneke, San Diego, CA (US); Mary Cozza, Encinitas, CA (US); Michael S. Dawes, San Diego, CA (US); Susan M. Duthie, Lake Arrowhead, CA (US)

(73) Assignee: Dyna LLC, Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,280

(22) Filed: Jun. 13, 2012

(65) Prior Publication Data

US 2013/0143609 A1    Jun. 6, 2013

Related U.S. Application Data

(63) Continuation of application No. 11/452,099, filed on Jun. 13, 2006, now Pat. No. 8,204,519.

(60) Provisional application No. 60/690,556, filed on Jun. 13, 2005, provisional application No. 60/690,357, filed on Jun. 13, 2005, provisional application No. 60/690,356, filed on Jun. 13, 2005.

(51) Int. Cl.
*H04W 4/00* (2009.01)
*H04W 4/14* (2009.01)
*H04W 8/24* (2009.01)

(52) U.S. Cl.
CPC ............. *H04W 4/14* (2013.01); *H04W 8/245* (2013.01)
USPC .......................................................... 455/466

(58) Field of Classification Search
USPC ............. 455/419, 418, 412.1, 517, 466, 411, 455/456.1, 456.5, 413, 414.1; 713/189, 713/176, 193, 166; 709/215
See application file for complete search history.

(56) References Cited

U.S. PATENT DOCUMENTS

| | | | | |
|---|---|---|---|---|
| 6,275,694 | B1 * | 8/2001 | Yoshida et al. | 455/419 |
| 2001/0046854 | A1 * | 11/2001 | Henry et al. | 455/419 |
| 2004/0030906 | A1 * | 2/2004 | Marmigere et al. | 713/189 |
| 2005/0070298 | A1 * | 3/2005 | Caspi et al. | 455/456.1 |

* cited by examiner

*Primary Examiner* — Kiet Doan
(74) *Attorney, Agent, or Firm* — Straub & Pokotylo; Michael P. Straub; Stephen T. Straub

(57) ABSTRACT

Method and apparatus for using text messages, e.g., SMS messages, to trigger a device update and/or to update a communications device, e.g., cell phone, are described. The cell phone can be updated/programmed from a remote device. The updating can use SMS messages to accomplish the update. An SMS message may include a command and, optionally, other update information in the message body. Received SMS messages are checked to determine if they include an update command. If an update command is present the command is performed after a security check is satisfied. In some but not necessarily all embodiments, a simplified user interface is supported in addition to SMS update features.

15 Claims, 17 Drawing Sheets

EXEMPLARY SMS TEXT MESSAGE

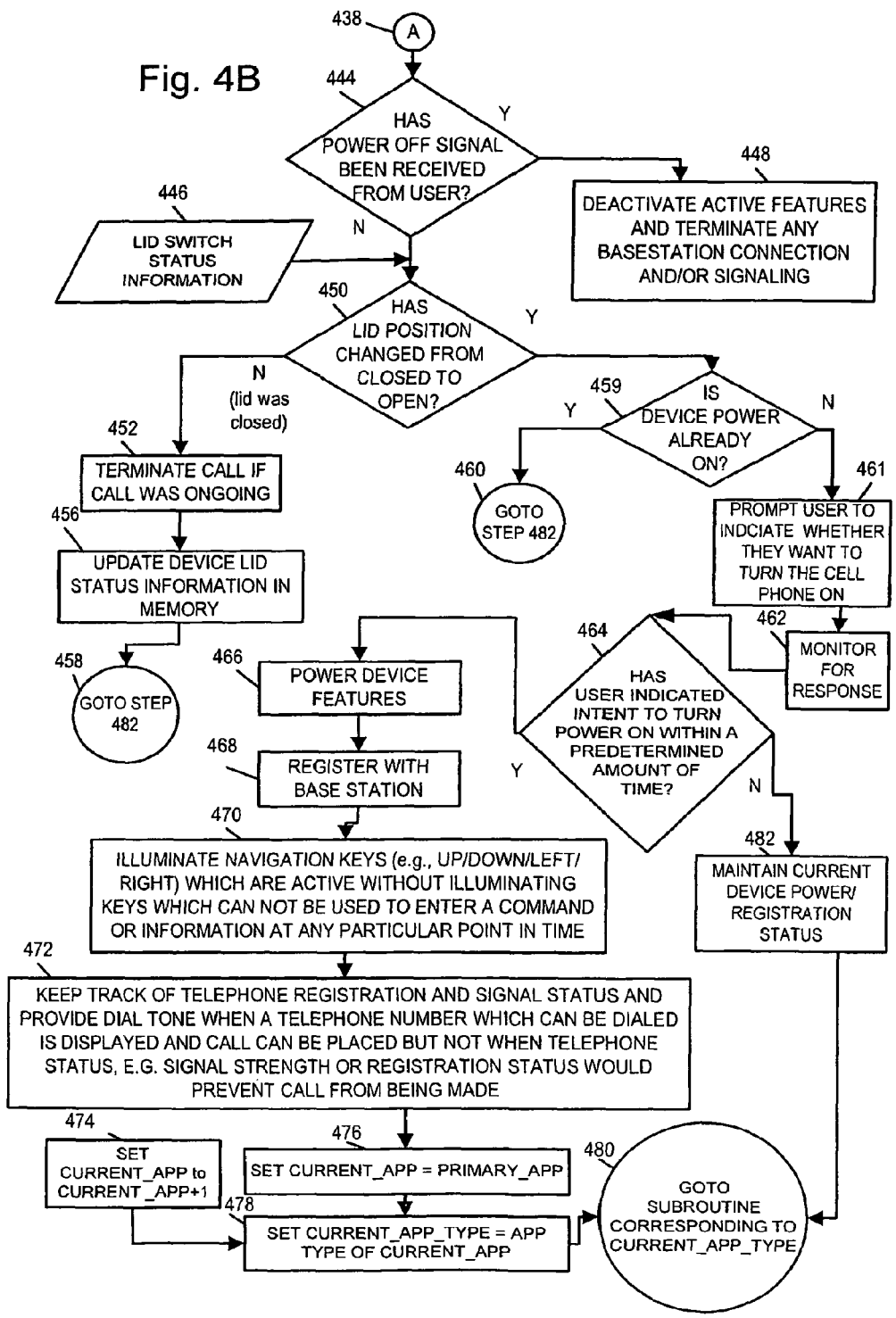

EXEMPLARY SMS TEXT MESSAGE (SMS UPDATE ROUTINE)

EXAMPLE OF BOOK APPLICATION 1

EXAMPLE OF APPLICATION 3

EXAMPLE OF APPLICATION 3

TOP LEVEL ARCHITECTURE OF UI DESIGN

METHODS AND APPARATUS FOR UPDATING A COMMUNICATIONS DEVICE USING SMS MESSAGES

RELATED APPLICATIONS

The present application is a continuation of U.S. patent application Ser. No.: 11/452,099 filed on Jun. 13, 2006, now U.S. Pat. Pat. No. 8,204,519 titled "METHODS AND APPARATUS FOR UPDATING A COMMUNICATIONS DEVICE USING SMS MESSAGES", which claims the benefit of U.S. Provisional Patent Application Ser. No. 60/690,556, filed on Jun. 13, 2005, titled "IMPROVED COMMUNICATIONS DEVICE METHODS AND APPARATUS INCLUDING ERGONOMIC KEY LAYOUT AND INTUITIVE USER INTERFACE", U.S. Provisional Patent Application Ser. No. 60/690,357, filed on Jun. 13, 2005, titled "METHODS AND APPARATUS FOR UPDATING A COMMUNICATIONS DEVICE USING SMS MESSAGES", and U.S. Provisional Patent Application Ser. No. 60/690,356, filed on Jun. 13, 2005, titled "SIMPLIFIED INTUITIVE CELL PHONE USER INTERFACE", each which is hereby expressly incorporated by reference.

FIELD OF THE INVENTION

The present invention relates to methods and apparatus for updating portable devices, e.g., cell phones, using messages such as, e.g., text messages.

BACKGROUND

The usefulness of a device, and whether or not a device gets used at all, often depends on the complexity of the device's user interface and the ability of a user to easily determine how to control the device.

Individuals who intend to use an electronic device frequently and require advanced functionality may be willing to spend the time reading detailed instructions and learning how to take advantage of the power provided by a relatively complex user interface with a large number of input keys. However, for less demanding users, a lower complexity relatively intuitive interface would be desirable.

One group of users who tend to resist complex user interfaces are senior citizens. Such individuals may have difficulty operating small keys due to physical constraints including poor eyesight and/or physical dexterity. In addition, in the case of devices they do not intend to use frequently, they may be reluctant to spend significant amounts of time studying instruction manuals to learn how to use such devices.

For personal safety, security and other reasons, many family members are now encouraging senior citizens to keep a cellular telephone with them so that they can call for help in the event of an emergency. Unfortunately, existing feature laden cell phones are generally optimized for young individuals who are heavy cell phone/instant messaging users. Such users are generally willing to take the time to learn to navigate a relatively complex user interface to obtain the benefit of the specific features they seek. In the case of high use users, it is often wasteful and distracting to prompt the user as part of the process of offering them various features which they can execute. Such frequent users tend to become familiar with menu options and excessive prompting with yes/no type questions can become more of an annoyance than a help.

In addition to their tendency to use cell phones much more frequently then elderly individuals, young individuals rarely suffer the dexterity and eyesight problems of older users.

In view of the above discussion, it should be apparent that relatively low complexity user interfaces which are intuitive by nature can be highly desirable in particular applications, e.g., electronic device applications intended for senior citizens. In the case of senior citizens, it would be desirable if the number of keys required on a portable device could be limited so that they could be kept relatively large in size thereby making them easier to identify and operate than smaller keys placed on a keypad which includes a large number of keys. For applications intended for senior citizens, it can be desirable that a user interface simulate a process or flow similar to that found in many non-electronic applications with which a senior citizen may be familiar, e.g., a paper book or directory.

Conventional cell phones with their relatively small input keys, large number of input keys, and relatively complicated menus leave much to be desired from the perspective of many senior citizens.

Accordingly, in addition to improvements in simplified user interfaces generally, it would be highly desirable if some user interface improvements, e.g., in terms of reducing the overall complexity and number of input keys used, could be applied to cell phones to make them easier for senior citizens to use, e.g., in the case of emergencies or to obtain basic cell phone device functions/features.

SUMMARY OF THE INVENTION

The present invention is directed to methods and apparatus for implementing and updating portable devices, e.g., cell phones, personal digital assistants, etc.

In accordance with some exemplary embodiments of the invention, messages, e.g., text messages such as SMS text messages, which are normally used to communicate information to a user of a device, are used to communicate a command and/or data used to update the device.

Devices implemented in accordance with the invention examine the content of an SMS message, e.g., prior to display, to determine if a received text message is a message intended to support a device update operation or is a text message intended to be displayed to the user of the device.

Determination of whether or not an SMS message is a device update message may include examining the message to determine if it includes a command used to implement a device update and/or header information indicating that the message is an update message.

In some embodiments, update messages are processed and used to update the portable device but the content of the message may not be displayed and the device may be programmed so that it does not report the update message as a SMS message intended for the user of the device, i.e., a text update message may be omitted from the user's in box while other SMS messages are placed in an inbox and their contents are displayed to the user.

A text update message implemented in accordance with the present invention may include a command and/or data. The command may instruct the device to enable or disable a feature, store data, retrieve data from an external source and or to implement a particular routine or function. Phone book or other user data communicated in the SMS message may be loaded into memory in accordance with the command included in the received text message. The storage may involve, e.g., adding data to a phonebook, overwriting an exiting entry, or updating an entry. The storage may also involve storing a routine in an internal storage device and/or other communicated information.

The text update messages of the invention can be used to trigger the device to contact an outside data source, e.g., server, and retrieve waiting update information. In the case of a cell phone this may involve triggering the cell phone to initiate a call to an external server and download update information via the wireless call connection. In some embodiments, a text message may trigger the portable device to retrieve information and/or an update via a charger unit with land line or other connectivity when the phone is placed in the charger unit. In such embodiments, the charger unit may serve as an interface to a land line telephone or network connection avoiding any need to send a significant amount of data and/or routines over an air link to perform a device update.

Thus, in various embodiments text messages, e.g., SMS text messages, can be used to initiate and/implement device updates. Since the trigger and/or updating can be performed using conventional SMS text message transmission techniques, the methods of the invention are well suited for use in existing wireless communications networks which support one or more forms of text messages.

In one embodiment, as a security procedure, text messages used to trigger device updates are checked prior to transmission to the wireless terminals to make sure the update message is from a source, e.g., server, authorized to generate and send such update messages. The security check may be performed in an SMS server, base station, or gateway device responsible for processing text messages prior to transmission to wireless terminals over an air link. In some embodiments, static IP addresses are used for devices authorized to send SMS update messages and update messages sent using IP addresses which differ from the IP addresses corresponding to devices authorized to send such messages are dropped.

While numerous features and embodiments have been described, it should be appreciated that not all embodiments include the full set of above described features and some embodiments may use one or more of the above described features and/or methods. Furthermore, it should be appreciated that may of the methods can be used with both complex and simplified cell phone devices so that many of the methods are not dependent on use of devices with a relatively small number of keys or other physical attributes which are not necessary to a particular method or embodiment. Additional features, embodiments and benefits of the methods and apparatus of the present invention will be discussed below in the detailed description which follows.

DETAILED DESCRIPTION

The present invention relates to communications devices. The invention is also directed to methods and apparatus for providing improved user interfaces, e.g., user interfaces which are suitable for portable communications devices.

The methods and apparatus of the present invention address complexity and user interface issues from both a hardware and user interaction perspective. Various hardware, physical design, switch and keypad features will first be discussed followed by a discussion of device operation and user interface flows which may be used in various embodiments of the present invention. The various features, alone or in combination, work to reduce the user interface complexity, reduce the number of choices presented to a user, provide a clear choice of options at various stages of performing a process or using the device and/or provide improved physical ergonomics which make it easier for a user with limited dexterity to operate the device of the present invention in a reliable manner. Various methods of updating services, device functionality, and/or information stored on the device are also described. The update methods are designed so that they can be used without the need for a text keypad or text entry capability on the device. The updates can be initiated remotely, e.g., by a personal computer or other device which initiates transmission of a message to the communications device to be updated. As will be discussed below, the update message can be received and processed in a manner that is transparent to the user. Various embodiments rely on (Short Message Service) SMS messages which are received, detected, and processed by the receiving device with or without notifying the user of the device that the update message was received. The SMS device update message features of the present invention are compatible with existing SMS message delivery services allowing the methods to be used with conventional cellular communications delivery systems, existing base stations and communications networks.

Portable devices implemented in accordance with the invention may include, e.g., cell phones, personal data assistants or other portable devices capable of receiving/sending information. In various embodiments, exemplary communications devices implemented in accordance with the invention are designed with relatively few keys and a user interface which is simple to use from the end user's perspective.

Figure 1:
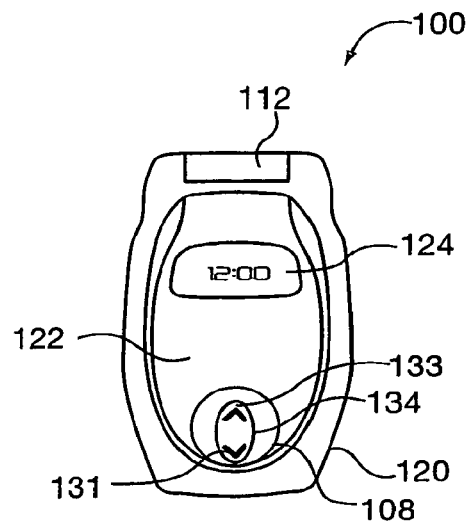
FIG. 1 illustrates an exemplary cell phone implemented in accordance with the invention.

FIG. 1 illustrates an exemplary device 100, e.g., cell phone 100 implemented in accordance with the present invention which will be used in explaining various hardware and user interface features of the invention. It should be noted that numerous variations on the device 100 are possible and that all the features of device 100 need not be included in all device embodiments.

As illustrated the cell phone 100 includes a cover assembly 122 which is connected to main body 120 via a hinge 112 which allows the lid assembly 122 to be flipped open. The lid assembly 122 includes an external display 124 and a two button switch assembly 108. The two button switch assembly 108 is used in various embodiments to control audio output volume. The switch assembly 108 includes a first button 131 corresponding to a first switch positioned below the button 131 and a second button 133 corresponding to a second switch positioned below the second button 133. In some embodiments each button 131, 133 is implemented as a raised portion of a toggle switch cover 134 with the portion of the toggle type switch corresponding to each button 131, 133 being identified by an arrow printed on the toggle type switch cover 134. Completely independent buttons may, and in some embodiments are, used for buttons 131, 133 as an alternative to placing both buttons on a single toggle type switch cover 134. The switch assembly 108 is positioned towards the center of the outer edge of the lid 122 opposite a lid hinge 112. The location of buttons 131, 133 is convenient for accessing using a finger of a hand which is holding the phone when holding the phone to one's ear in an open lid position. This is a position commonly used for making a telephone call. As will be discussed further below, the operation performed in response to depressing the buttons 131, 133 switches depending on whether the lid 122 is in the open or closed position. In the FIG. 1 example, when closed, the button 131 is used to lower the audio output, e.g., ring tone volume, while button 133 is used to raise the ring tone volume. When the lid 122 is flipped open, in the exemplary embodiment the function of the buttons 131, 133 is reversed with button 133 being used to lower the audio volume and button 131 being used to raise the audio volume. In one embodiment, while the lid 122 is closed, buttons 131, 133 are used control ring tone volume and/or other the volume of other sound outputs, e.g., beeps, generated by the cell phone 100. When the lid 122 is in a flipped-open position, the audio volume which is controlled depends on the mode of operation of the phone 100. If a call is ongoing, the buttons 131, 133 are used to control call audio volume and do not affect ring tone volume. When the lid is flipped open and no call is on-going, buttons 131, 133 are used to control, e.g., ring tone volume, without affecting the audio output level of the next telephone call which is answered or placed using the phone 100.

Figure 2:
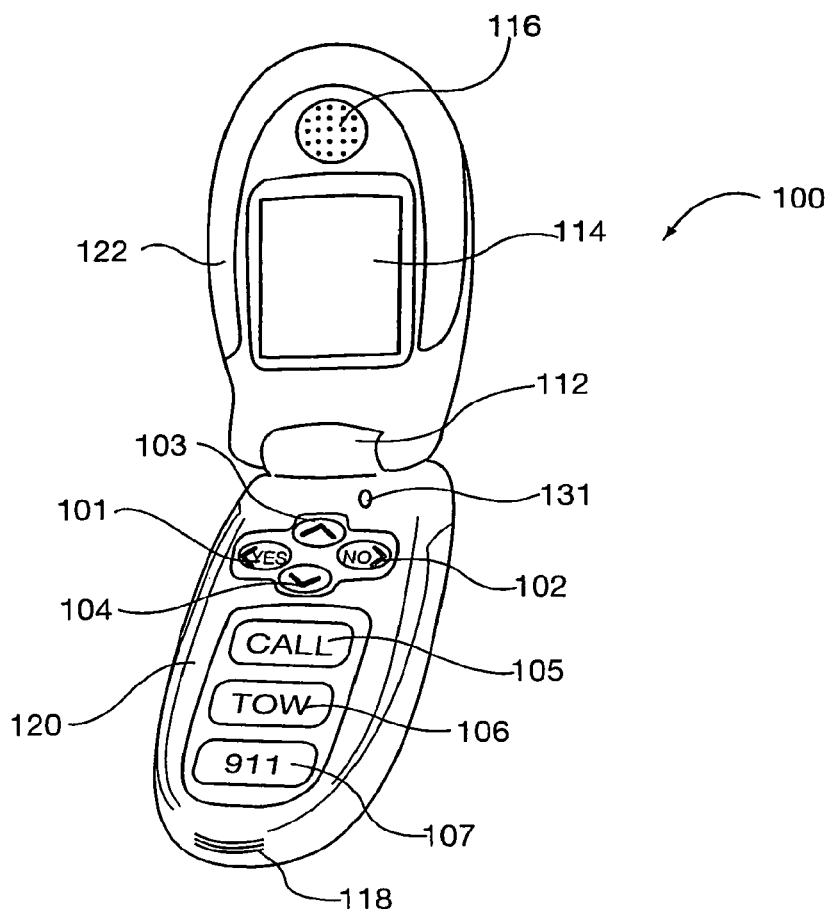
FIG. 2 illustrates the cell phone of FIG. 1, with the lid open.

FIG. 2 shows the cell phone 100 of FIG. 1 in greater detail with the lid assembly 122 being in the flipped-open position. In the open position, it can be seen that the inside of the lid 122 includes a speaker 116 and main display 114. It can also be seen that the main body 120, which is the bottom portion of the cell phone, includes a relatively limited number of input keys and a microphone 118.

The bottom portion 120 of the cell phone includes a microphone 118 and various user control keys 101, 102, 103, 104, 105, 106, 107 in addition to a lid position sensor 131. The user interface is controlled by 4 primary control keys which 101, 102, 104, 103. The function of these keys can be interpreted depending on the state of device operation and the application being executed at a particular point in time. Frequently, keys 103, 104 are used as up/down arrow keys for controlling scrolling thorough menu options. Keys 101, 102 are frequently used, depending on the state of device operation, as left and right arrow keys, respectively or yes/no selection keys respectively. The three large keys 105, 106, 107 at the bottom of the cell phone are used for making telephone calls to pre-programmed or set telephone numbers. In one particular embodiment as shown in FIG. 2 button 105 is used to initiate a call to a dedicated telephone number, e.g., a number corresponding to a telephone operator who can assist in completing a call to a telephone number supplied via speech. Button 106 is shown as a button used to make a call to a towing service. In some embodiments a user is allowed to program button 106, via an SMS message or other update method which does not involve entry of the phone number from the keys on the phone, to correspond to a telephone number of the user's choosing, e.g., a relative or medical service. In other embodiments, button 106 is used to initiate a voice dialing operation. Speech recognition may be performed in the telephone when button 106 is pressed or a call may be established to a dedicated voice dialing platform which then completes the call in response to a voice dialing command. The voice dialing command may specify the number to be dialed by stating the number to be dialed or by indicating the name of a person to be called in which case, after performing speech recognition to identify a name, a telephone number associated with the name is called. The third button 107 is shown as a button which is dedicated to making emergency calls, e.g., calls to 911.

In some embodiments, the need to activate a power-on button is eliminated with the user begin prompted to confirm that the user wants to transition to a full on mode when the switch 131 detects a transition from a lid closed to a lid open position. By requesting confirmation from the user that the device should enter full on mode, e.g., from an off or reduced power (sleep) mode of operation, after detecting opening of the lid, switching to full on mode and battery drain is avoided in those cases where the lid may accidentally be flipped open, e.g., while in a purse or storage compartment.

In contrast to most cell phones, the cell phone 100 includes fewer than 10 keys, i.e., just 7 keys on the main keypad. The limited number of control keys, less than 10 in total in the illustrated example, makes it possible to provide large key sizes than would be possible if more keys were provided. Notably, in the illustrated exemplary embodiment the presence of number (0-9) or text input keys is avoided as one of the purposes of the simplified cell phone is to provide a simplified user interface and easy to use keys. Programming of phone numbers and other information is performed using an external device which may generate and send information update messages or other signals to the cell phone to implement changes in device functionality and/or to update information such as telephone number information stored in the cell phone 100.

Notably, unlike many conventional phones which are intended to allow for input of text information and thus include a comparatively larger number of keys, the relatively simple keypad shown in FIG. 2 allows for relatively large keys given the low total number of keys on the device. In some embodiments, keys 105, 106, 107 are at least 2 centimeters across and 0.5 centimeters high. However, in some embodiments the keys 105, 106, 107 will be between 2.5 and 3.25 centimeters across. The height of the keys 105, 106, 107 is usually less than the width. The height of the keys is normally ½ to ¾ the width of the keys 105, 106, 107. Thus, the width of the keys may be in the range indicated with the corresponding height being between ½ and ¾ the width of the key. Thus a wide range of widths and heights may be supported depending on the embodiment for the dedicated call initiation keys 105, 106, 107.

In addition, keys 101, 102, 103, 104 are, in some embodiments at least 1.25 centimeters across. These keys are commonly in the range of 1.25 and 1.75 centimeters across. The height of these keys may be the same as or similar to the height of keys 105, 106, 107 although other heights may be supported. These key sizes are considerably larger than the sizes of many conventional cell phone keypads making them easier to locate and operate than many conventional cell phone keys.

The lid position sensor plays a role, in various embodiments, in determining the function performed at different points in time by the other input keys, e.g., volume control buttons 131, 133 mounted on the external portion of the lid 122.

The lid position sensor 131, which may be implemented as, e.g., a contact switch or photo-sensor, is included in the bottom portion 120 of the cell phone 100. The output of the lid position sensor 131 is used to detect lid position and thereby control or trigger various operations such as the change, e.g., reversal, of function between the volume keys 131, 133 as compared to when the lid 122 is in the closed position.

Figure 3:
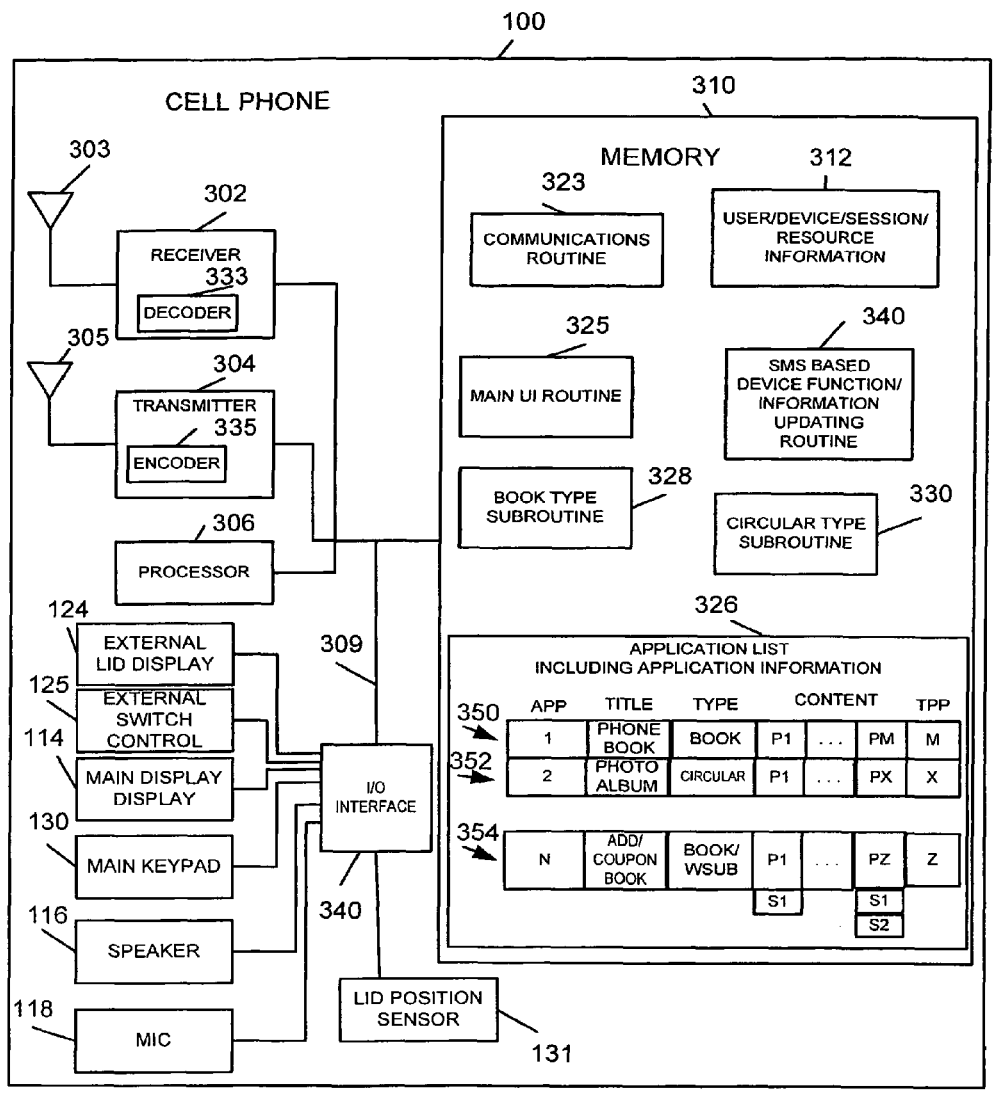
FIG. 3 is a block diagram of the exemplary cell phone of FIG. 1.

FIG. 3 illustrates, in block diagram form, the exemplary cell phone 100, implemented in accordance with the present invention. While a cell phone is shown, the invention is applicable to a wide range of devices including, e.g., Personal Data Assistants (PDAs). The cell phone 100 includes receiver and transmitter antennas 303, 305 which are coupled to receiver and transmitter circuitry 302, 304 respectively. The receiver circuitry 302 includes a decoder 333 while the transmitter circuitry 304 includes an encoder 335. The receiver transmitter circuits 302, 304 are coupled by a bus 309 to a memory 310.

In addition to including circuitry for receiving and transmitting communications signals, the cell phone 100 includes, as discussed with regard to FIGS. 1 and 2, the external lid display 124, control switches 125, 127 for receiving input via buttons 131 and 133, respectively, main display 114, a main keypad 130 including keys 101, 102, 103, 104, 105 and 107, speaker 116, microphone 118 and lid position sensor 131. These various input/output elements are coupled to the processor 306 and memory 310 via an I/O interface 340. The I/O interface 340 couples the input/output devices to the bus 309 which is used to couple the various components 302, 304, 306 and 310 together.

Processor 306, under control of one or more routines stored in memory 310 causes the cell phone 100 to operate in accordance with the methods of the present invention. The cell phone 100 supports, via software control and various routines a user interface in accordance with the invention. In order to control cell phone operation memory 310 includes communications routine 323, and main user interface routine 325. The main user interface routine 325 is responsible for insuring that the cell phone operates in accordance with the methods of the present invention. The main UI routine 325 may call one or more subroutines including a book type subroutine 328, circular type subroutine 330, SMS based device function/information updating routine 340 and one or more other routines. The memory 310 also includes user/device/session/resource information 312 which may be accessed and used to implement the methods of the present invention and/or data structures used to implement the invention. The memory 310 also includes an application list 326 which includes corresponding application information. The application list 326 includes the order of applications to be presented and various application information such as the number of subpages in a particular application.

In the FIG. 3 example, the application list 326 includes a list of N applications, where each application corresponds to a row 350, 352, 354 in the list 326. For each supported application, the application entry indicates the presentation order of the application in the first column of the entry. In the FIG. 3 example, the entry 350 corresponds to the primary application, identified in column 1 as APP 1. The last entry 354 corresponds to the Nth application to be presented which is the last entry in the FIG. 3 example. Each application entry 350, 352, 254 also includes information indicating the title of the application, the UI type of application (e.g., book, circular, book with subpages), and the pages of the application identified under the heading CONTENT. Each page may include information and/or prompts to be presented to the user as well as information, e.g., telephone numbers or contact information, used to implement an action which may be selected by a prompt which is presented. Each entry in the FIG. 3 embodiment also includes a value TPP indicating the total number of presentation pages included for the application. In the case of the first application, entry 350 includes M total presentation pages. As will be discussed in various examples which follow, the value TPP can be used in determining whether the last page of the application has been reached and the action to be taken in response to an up/down arrow request from the last page. In the case of an application with subpages such as application N, the entry 354 may include one or more subpages (S1, S2, etc.) associated with each application page. A total count of subpages includes with the presentation page may also be included for each presentation page including subpages. While total page and subpage counts are useful, they can be determined during implementation of the UI form the page and subpages stored in the application list 326 and therefore need not be stored in the list 326 if memory is limited.

The various subroutines, e.g., the book type subroutine 328 and circular type subroutine 330 may each be implemented as an application. An example of an application which may be implemented as a book type subroutine is a telephone book application. An example of an application which may be implemented as a circular type subroutine is a photo album. Accordingly, although identified for purposes of explaining the invention, the various interface subroutines may each be implemented as an application. Multiple applications, e.g., multiple book type subroutines 328 may be supported at the same time. The application list 326 lists the order in which applications are to be accessed and presented as well as information on the content of the applications such as various parameters that serve as the input to the subroutines used to implement the particular application. Application information in the case of a phonebook application might include, e.g., a plurality of telephone entries in which each entry might include a telephone number and name. Information indicating the total number of entries in the telephone book would also normally be included in the application list 326.

Operation of the various routines and subroutines of the present invention which can be used to implement applications such as phonebooks, photo albums and coupon books will be discussed with respect to the various flow charts discussed below.

Figure 4A:
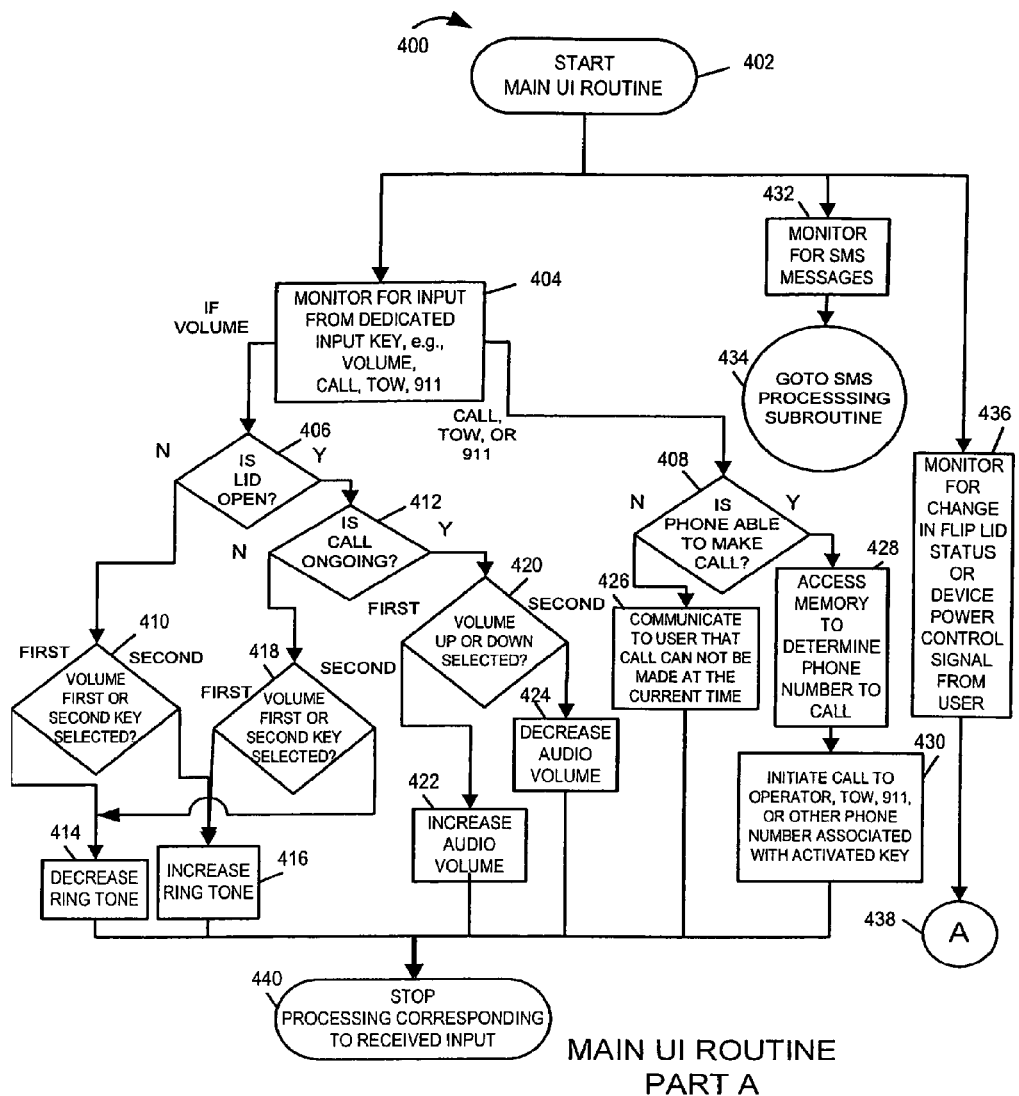
FIG. 4, which comprises the combination of FIGS. 4A and 4B, illustrates a main user interface routine implemented in accordance with one exemplary embodiment of the invention.

Operation of the cell phone, with respect to the user interface features, is controlled by the main user interface routine 325. FIG. 4, which comprises the combination of FIGS. 4A and 4B, illustrates an exemplary main UI routine 400 which can be used as the user interface routine 325 of the cell phone 100.

The main UI routine 400 starts in step 402 when the cell phone is initially activated. In start step 402 the UI routine 400 begins being executed by the processor 306 and thus begins controlling operation of the cell phone. From start step 402, operation proceeds along various processing paths which can be performed in parallel. Thus, from step 402, operation progresses to multiple steps including steps 404, 432 and 436 which correspond to different processing paths.

The first processing path which begins with step 404 is responsible for responding to dedicated input keys, e.g., volume control buttons, the call, tow, and emergency (911) keys. In step 404, the cell phone monitors for one of the dedicated keys being activated. Upon activation of one of the dedicated keys, operation proceeds from step 404 along the processing path corresponding to the dedicated key which was activated. Thus, in step 404, if it is detected that one of the volume control buttons 131, 133 was depressed, operation proceeds to step 406 which is the start of a volume control processing path. However, if activation of one of the dedicated keys used to initiate a call to a phone number is detected in step 404 operation proceeds to step 408 which is the start of a call imitation processing path.

As discussed above, the increase/decrease volume control functions of the buttons 131, 133 changes depending on whether the lid 122 is in the open or closed position. In step 406, a determination is made as to whether the lid is open or closed, e.g., based on the output of sensor 131.

If the lid is closed, the ring tone volume is controlled by the buttons 131, 133 with operation proceeding from step 406 to step 410. In step 410, a determination is made as to whether the first volume control button 131 or the second volume control button 133 was activated. If the first button 131 was activated operation proceeds to step 414 in which the ring tone volume setting is decreased. After implementing the user selection to decrease ring tone volume in step 414 operation proceeds to step 440 where processing corresponding to the detection of the pressed key, e.g., volume control key 131, stops. Depressing the volume control key again will result in additional processing since the monitoring in step 404 is performed on an ongoing basis.

In step 410 if it was determined that the second button was pressed indicating that the ring tone volume was to be increased, operation progresses from step 410 to step 416. In which the ring tone volume is increased prior to operation proceeding to stop step 440.

As noted above, if the lid is open when the volume control is pressed, processing is different than when the lid is closed. In step 406, if it is determined that the lid was open when the volume button was depressed operation proceeds to step 412. In step 412 a determination is made as to whether a call is ongoing. If a call is not ongoing, operation proceeds from step 412 to step 418 in which a determination is made as to whether the first 131 or second 133 volume control key was depressed. If the first volume control key 131 was depressed operation proceeds to step 416 in which the ring tone is increased (which is opposite what would happen if the lid was closed). However, if it is determined that the second volume control button 133 was activated, operation proceeds to step 414 in which the ring tone volume setting is decreased.

Referring once again to step 412, if it is determined that a call is ongoing, operation proceeds to step 420 instead of to step 418. If the first volume control key 131 was activated, operation proceeds to step 422 where the audio volume of the ongoing call is increased before processing in response to the depressed volume key stops in step 440. However, if in step 420 it is determined that the second key 133 was depressed indicating an intent to decrease call volume, operation proceeds to step 424. In step 422 the audio volume of the ongoing call is increased by changing the volume setting for the call before processing stops in step 440. In step 424 the audio volume of the ongoing call is decreased by changing the volume setting for the call before processing stops in step 440. Thus, the volume keys (131, 133) are used to control audio volume as opposed to ring tone volume when a call is ongoing.

Having described the call volume control process, the use of a dedicated key to initiate a call will now be described. In step 404 if it is detected that one of the dedicated call keys 105, 106, 107 has been depressed, operation proceeds to step 408. In step 408, a determination is made as to whether the phone can place a telephone call, e.g., if it is registered and has a communications connection with a BS through which it can complete a call. If a call can not be placed, operation proceeds to step 426 in which the user is notified, e.g., through the use of an audio message or signal and/or a visual display, that the call can not be made at the current time. Operation then proceeds to stop step 440.

However, if in step 408 it is determined that the phone 100 is able to make a call, operation proceeds to step 428 in which memory is accessed to determine the phone number corresponding to the depressed button 105, 106, 107. Then, in step 430 a call is placed to the telephone number stored in memory corresponding to the depressed call key 105, 106 or 107. Thus, if button 105 is depressed a call will be made to an operator, and if button 106 is depressed a call will be made to a tow service or another number previously programmed into the phone to be associated with button 106. If the 911 key 107 is depressed the phone will make a call to 911 for emergency service. After the call is placed, operation proceeds to step 440 with processing associated with the depressed call button having been completed. While the processing associated with the depressed button stops, the initiated call will continue and is allowed to terminate in the normal manner.

In addition to performing volume control and controlling calls to dedicated telephone numbers, a portion of the main UI routine is responsible for monitoring for SMS messages which, in accordance with the invention can be intended for the user as is commonly the case in most systems or, in accordance with the invention can be used to update phone functionality including applications and/or other information used by the main user interface routine.

In step 432, which occurs on an ongoing basis, the cell phone 100 monitors for SMS messages. If an SMS message intended for the cell phone 100 is detected in step 432 a call is made in step 434 to the SMS processing subroutine which will be discussed in detail below with reference to FIG. 8.

In addition to the various functions already described, when in the powered on state, the user can implement various operations, e.g., dial operations, and use various applications, e.g., a photo album, in addition to a phone book application. In accordance with the present invention, in some embodiments power control, e.g., switching to a full on state, is controlled, in part, by a change in the position of the phones lid.

In step 436, the lid position sensor 131 is monitored to detect any change in the lid position from open to closed or closed to open, or another device power control signal from the user. Operation proceeds from step 436 to step 444 via connecting node A 438.

In step 444, a determination is made if a power off signal has been received from the user. Such a signal may be generated by a yes response to a question presented to the user inquiring if the user wants to turn the power off, e.g., after a telephone call has been completed or at some other stage in application processing.

If a power off signal has been received from the user, operation proceeds to step 448 where active features are deactivate and any existing basestation connections are terminated as part of powering off the device.

However, if in step 444 it is determined that a power off signal has not been received, operation proceeds from step 444 to step 450. The lid status information 446 is input to step 450. In step 450 if it is determined if the lid position has changed from closed to open indicating a possible attempt to power on the cell phone, then operation proceeds to step 459. If in step 450 it is determined that the lid position did not change from closed to open, i.e., the lid was closed, operation proceeds from step 450 to step 452. In step 452 if a call was ongoing it is terminated before operation proceeds to step 456. If no call was ongoing, operation proceeds directly from step 450 to step 456. In step 456, the current device lid status is updated in memory to reflect the new closed lid status. Operation then proceeds to step 482 via goto step 458.

If in step 459 it is determined that the cell phone is already operating in the on state, no change in power status is to be made and operation proceeds to step 482 via goto step 460. However, in step 459, if it is determined that the cell phone is not operating in the ON-state, operation proceeds to step 461. In step 461, the user is prompted to indicate whether they want to turn the cell phone power on. Next, in step 462, the cell phone monitors for a response from the user, e.g., depression of the key corresponding to a "yes" selection.

The monitoring continues in step 462 until a "yes" or "no" response is detected or a predetermined amount of time has past. Then, in step 464, a determination is made as to whether the user indicated an intent to turn the cell phone power on within the predetermined amount of time. If a "yes" was not received in the predetermined amount of time, operation proceeds to step 482 where the current device power and cell phone registration status are allowed to remain unchanged. Operation then proceeds to step 480 wherein a call is made to the subroutine, e.g., particular phonebook, photo or other application, corresponding to the current_app_type as determined by maintained information on the current application to be processed.

If in step 464 it is determined that a "yes" was received indicating that the user wants to turn the cell phone on, operation proceeds to step 466 in which the cell phone enters a full power on state of operation and then in step 468 proceeds to register with a base station. Next, in step 470, the navigation keys, up, down, left (yes) and right (no), are illuminated, in various combinations, on an ongoing basis while the cell phone power is on indicating which options are available to the user at any given time during execution of an application. During operation in the power on state, at points in time when an option corresponding to one of the navigation keys is not available, the cell phone will deactivate the light associated with particular navigation key until it becomes a valid option. In this manner, the user knows which keys can be used to make a menu selection or respond to a prompt at any given point and is not distracted by navigation keys which are not valid selection options.

Operation proceeds from step 470 to step 472. In step 472 the cell phone keeps track of device status information such as cell phone registration and signal status used to determine if the cell phone is capable of completing a call. The status information is updated based on signal and registration conditions while the cell phone is in the on state. In accordance with one feature of the present invention, the cell phone will generate a dial tone or other dial prompt when the user views a telephone number and a call can be completed but not when the telephone status information indicates a call can not be completed. The dial prompt which is supplied when a phone call can be placed may be an audible or visual prompt or using some other form of physical indicator such as vibration which may be suitable for the hearing or visually impaired. In some embodiments the prompt is not supplied when it is not possible to complete a call, e.g., due to inadequate signal strength/reception between a base station and the phone even though a phone number or phone book entry may be displayed. In some embodiments the dial tone is supplied to the user as an audible signal, e.g., when in a phone book or other application which displays phone numbers or names which can be selected to place a call and a call can be initiated but not when a call can not be completed. In some implementations, the user must remain on a phone number for a second or slightly longer before the dial tone is presented. In this way, the user's is not distracted by the dial tone when scrolling through phone book entries but is presented with the dial tone when stopping on an entry and a call can be placed.

The presentation of the dial tone automatically when a call can be placed provides the user with an interface which is similar to that of a conventional phone in which a dial tone is used to indicate that a call can be initiated. This is different from many current cell phones where no dial tone is used and a call is attempted whether or not the telephone is registered with a base station and able to complete a call. The dial tone presentation feature is performed on an ongoing basis.

With the dial tone feature active, operation proceeds to step 476 wherein the variable CURRENT_APP is initialized to equal the PRIMARY_APP. The CURRENT_APP is used to indicate which application should be processed and used to control the presentation of options and information to the user at any given point in time. The PRIMARY_APP is the first application to be presented to the user upon power up and is specified in memory. In the case of a cell phone, the PRIMARY_APP will normally be the phonebook application. Operation proceeds from step 476 to step 478. Each application, in accordance with the present invention, corresponds to one of a plurality of application types with the application type being used to determine how application pages are navigated and presented. Some exemplary application types include a book type application and a circular application. In a book type application, the user interface presents the user with information in a manner analogous to flipping through the pages of a book, i.e., the user can move forward to the end of the book or backward to the start of the book through the pages of the book type application. Upon reaching the end of the book type application pages the user can traverse backward from the last page, i.e., the user can not go forward to the first page of the book from the last page. The book type application has been found to be well suited for presenting telephone number and other information normally found in a book in a relatively easy to use and intuitive manner. By precluding the user from wrapping from the last entry to the first and making the user traverse back up the entries, a user such as an elderly person can easily keep track of their position within a set of phone book entries without being confused by wrapping unexpectedly to the first entry.

In step 478 the application type indicator is set equal to the application type of the CURRENT_APP in this way, the user interface subroutine appropriate for implementing the current application can be identified and called. The application type information is stored in memory along with the application identifier, and the pages of the application.

Application type setting step 476 is entered from step 476 when the power if turned on. However, it is also entered via step 474, e.g., when a user selects a different application form the one the user is currently viewing. In step 474 the value of the application identification counter CURRENT_APP is incremented by 1 to CURRENT_APP+1 with the result value wrapping around to identify the first application when the resulting value would exceed the value used to identify the last of the N applications supported by the cell phone. Thus, application type setting step 478 can be entered, e.g., as part of a return from another application, through step 474 in which case, the application type indicator CURRENT_APP_TYPE will be set to the application type of the CURRENT_APP to be used. Operation proceeds from step 478 to step 480. In step 480 processing proceeds via a GOTO step to the subroutine responsible for implementing the CURRENT_APP with the particular subroutine being determined by the type of application as indicated by the indicator CURRENT_APP_TYPE.

Figure 14:
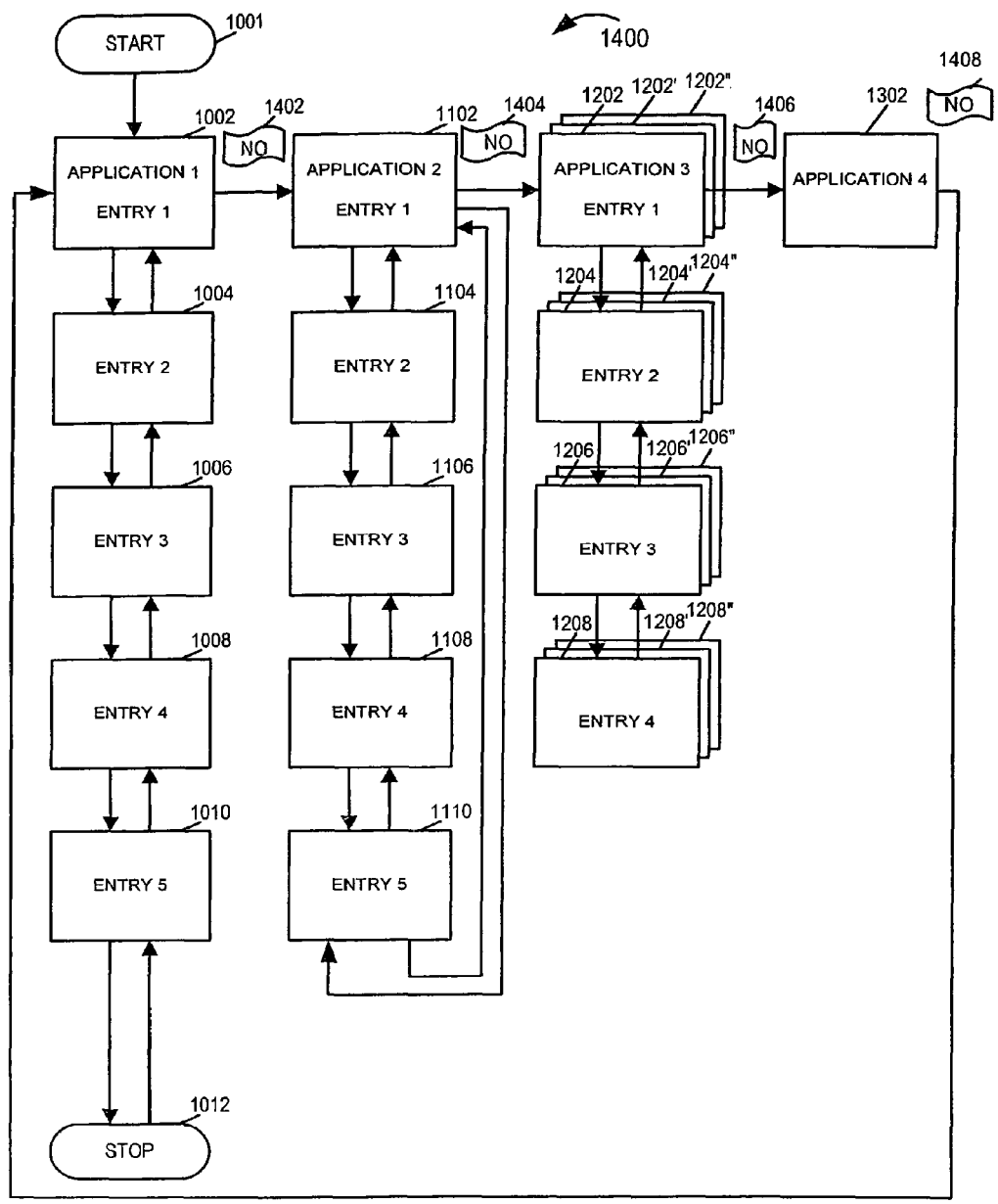
FIG. 14 illustrates a flow of a top level user interface implemented in accordance with the invention which includes a book type application, a circular type interface application, a book type interface application with sub-pages and an application with a single yes/no option selection.

Before proceeding to a discussion of the various application type subroutines which support the user interface of the present invention, it is useful to get an overview of the interactive UI of the present invention and the various application types which can make up the user interface. Generally, there are two basic types of applications supported, book type and circular type applications. A further variant of these two types of applications is to allow for each type of application to support subpages. Multiple types of applications can be combined to create a complete user interface for the cell phone 100 with multiple different applications being supported as shown in FIG. 14.

Normally, application ordering information, e.g., the order in which supported applications are to be presented is entered into the application list 326 along with the other application information such as page content, total number of pages in an application and the number of subpages, if any, corresponding to each page of an application. The application priority can be easily indicated by numbering the applications in order from 1 to N, where N is the last application to be presented and 1 is the first application to be presented.

Figure 10:
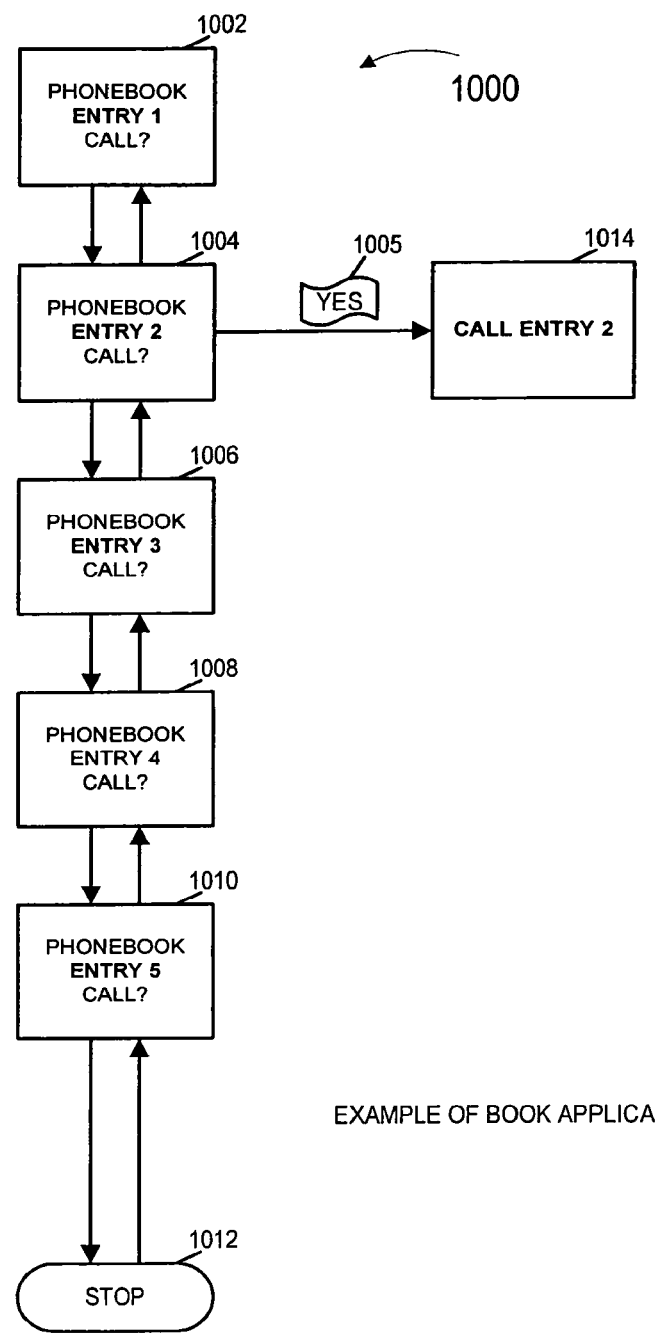
FIG. 10 illustrates an example book type application which can be used to implement a telephone book and present the user with call options.

FIG. 10 is an example of a book type application interface which includes a total of 5 pages, e.g., phone book entries. The exemplary application 1000 is a 5 entry phonebook where each entry corresponds to one application page. The total number of application pages to be presented (TPP) is equal to 5 in this example. The total number of presentation pages TPP along with the pages themselves are stored in the application list and application information 326 of the cell phone. In a book type application such as the one shown in FIG. 10, a user is presented with the first page and can progress up or down through the list of pages 1002, 1004, 1006, 1008, 1010. Upon reaching the last page the user can progress back up to a previous page but, based on the analogy to a physical book, is prevented from progressing beyond the last page as indicated by the stop action 1012. While on any page, in the context of a phonebook application, after the user stays on the page for a predetermined amount of time, the user is presented with a dial tone and the "call?" prompt assuming the telephone is in contact with a base station and can complete a call. In accordance with the invention, the dial tone and "call?" prompt is not provided if insufficient signal conditions exist to support a call.

The "yes" shown in FIG. 10 illustrates the case where the user responds to the call prompt when viewing the second page entry of the phonebook 1000. The YES selection 1005 results in a call being placed to the telephone number stored in memory corresponding to the second entry as indicated in step 1014. Each entry of the phonebook may include the name of the party to be called and the telephone number corresponding to the party. Depending on the particular implementation the name and/or number may be displayed along with or prior to presentation of the "call?" prompt.

Figure 11:
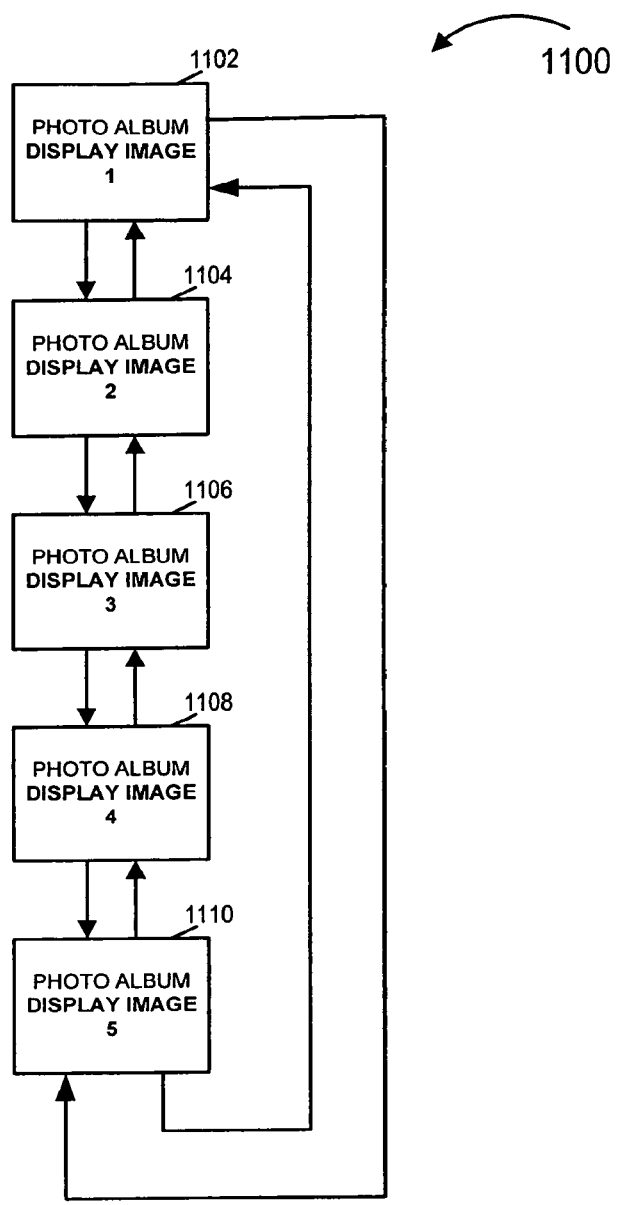
FIG. 11 is an example of a photo album application implemented using a circular interface application of the present invention.

In addition to book type applications such as the one shown in FIG. 10, the user interface of the present invention also supports circular type applications as shown in FIG. 11. FIG. 11 illustrates an exemplary circular type application in the form of a photo album application 1100. The circular photo album application 1100 includes a total of 5 photos, each corresponding to a different page 1102, 1104, 1106, 1108, 1110 of the photo album application. In this second example, TPP is again equal to 5. In the case of the circular type application the user is allowed to move up and down through the application pages, e.g., photos, but upon reaching the last photo in the album, rather than being stopped and required to return to the previous entry, the user is allowed to progress forward to the first entry in the photo album. As the user moves to a new page in the photo album, the corresponding image is displayed. The support of circular navigation allows for up and down navigation with a wrap around to the first entry from the last entry in the cause of a next entry selection or for a move from the first entry to the last entry in the case of the selection of a previous entry when positioned at the first entry 1102.

As discussed above, the basic book and circular type application interfaces can be further enhanced by supporting subpages corresponding to a main page of an application. Subpages can, in turn have subpages.

Figure 12:
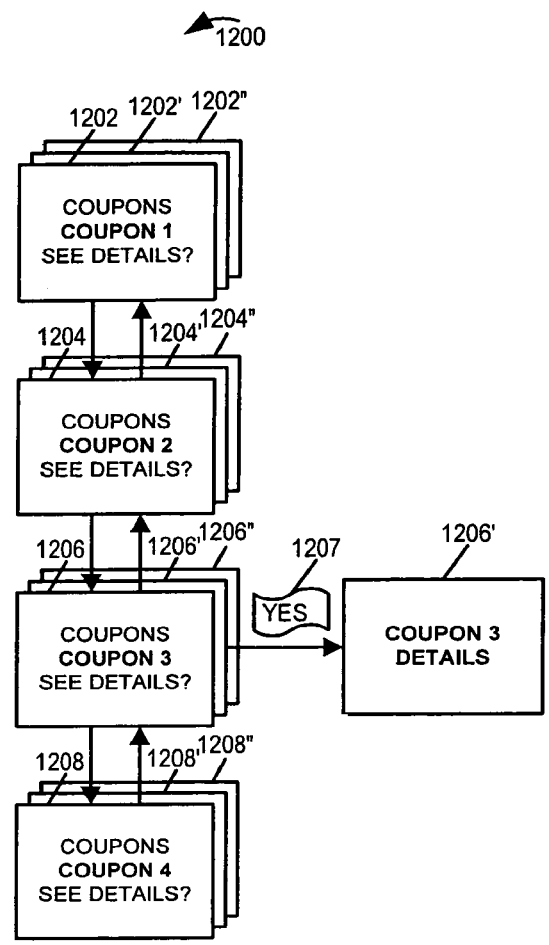
FIG. 12 is an example of coupon book type user interface application with sub-pages implemented in accordance with the invention.

In one embodiment, as shown in FIG. 12, a coupon book application is implemented as a booktype application 1200 with subpages which provide additional coupons and/or coupon details. In FIG. 12, the coupon application is implemented as a book type application including 4 main pages 1202, 1204, 1206, 1208, each main page corresponding to a coupon, with each coupon including 2 subpages (1202', 1202"), (1204', 1204"), (1206', 1206"), (1208', 1208") of coupon details or additional coupons. In the case where a subpage is available, the user is prompted if they wish to see the subpage information, e.g., additional details. If the subpage information is selected, as represented by YES 1207, the subpage corresponding to the user selection is accessed and presented.

Figure 13:
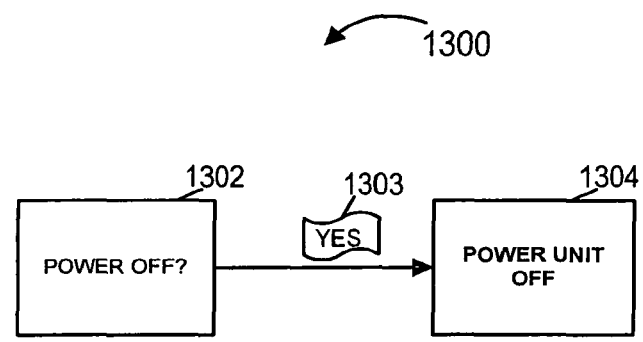
FIG. 13 illustrates a yes/no executable application which can be implemented in accordance with the invention.

In the case of very simple operations, the operation can be implemented as a single page application where the user is prompted if they wish the action associated with the application be implemented. FIG. 13 shows one such application 1300 where the application is a single page application responsible for prompting the user to determine if the user wants to turn the cell phone power off. Selection of the YES key as indicated by step 1303 in response to the prompt provided by the single page 1302, results in the cell phone implementing the action corresponding to the application, e.g., turning the power off as shown in step 1304 in the FIG. 13 example.

The various types of applications can be combined in accordance with the present invention as shown in FIG. 14 to provide a user interface which allows a user to progress between the various applications supported by the cell phone 100. In the FIG. 14 embodiment, the phone book application 1000 is designated as the first, e.g., primary application, the photo album 1100 as the secondary application, the coupon book 1200 application as the third application to be presented and the power off application 1300 as the fourth and last application that is supported. Thus, in the FIG. 14 example, the total applications supported (TAS) is equal to 4.

In the illustrated embodiment 1400, by entering a NO at the top level page of each application 1000, 1100, 1200, 1300, the user can shift from the first page of the current application to the first page of the next application in the application list. For example, while on page 1 1002 of application 1, by entering a NO 1402, the user can move to page 1 1102 of application 2. By entering NO 1404 the user can move to page 1 1202 of application 3. By entering NO 1406 again the user can move to page 1 1302 of application 4. By entering NO 1408 yet again the user is returned to page 1 1002 of application 1 since application 4 is the last of the applications which are supported in the exemplary embodiment of FIG. 14.

Within an application, the user can move up and down through the pages of the application by using the up/down arrow keys and can select the yes option when on a page to request implementation of an action in response to a prompt provided on a page or subpage.

Thus, as illustrated in FIG. 14, the various types of user interface applications contemplated in accordance with the invention can be integrated together while allowing navigation and user selections with no more than 4 input (up/down/yes/no) keys being required at any point in the navigation/selection process.

Figure 5:
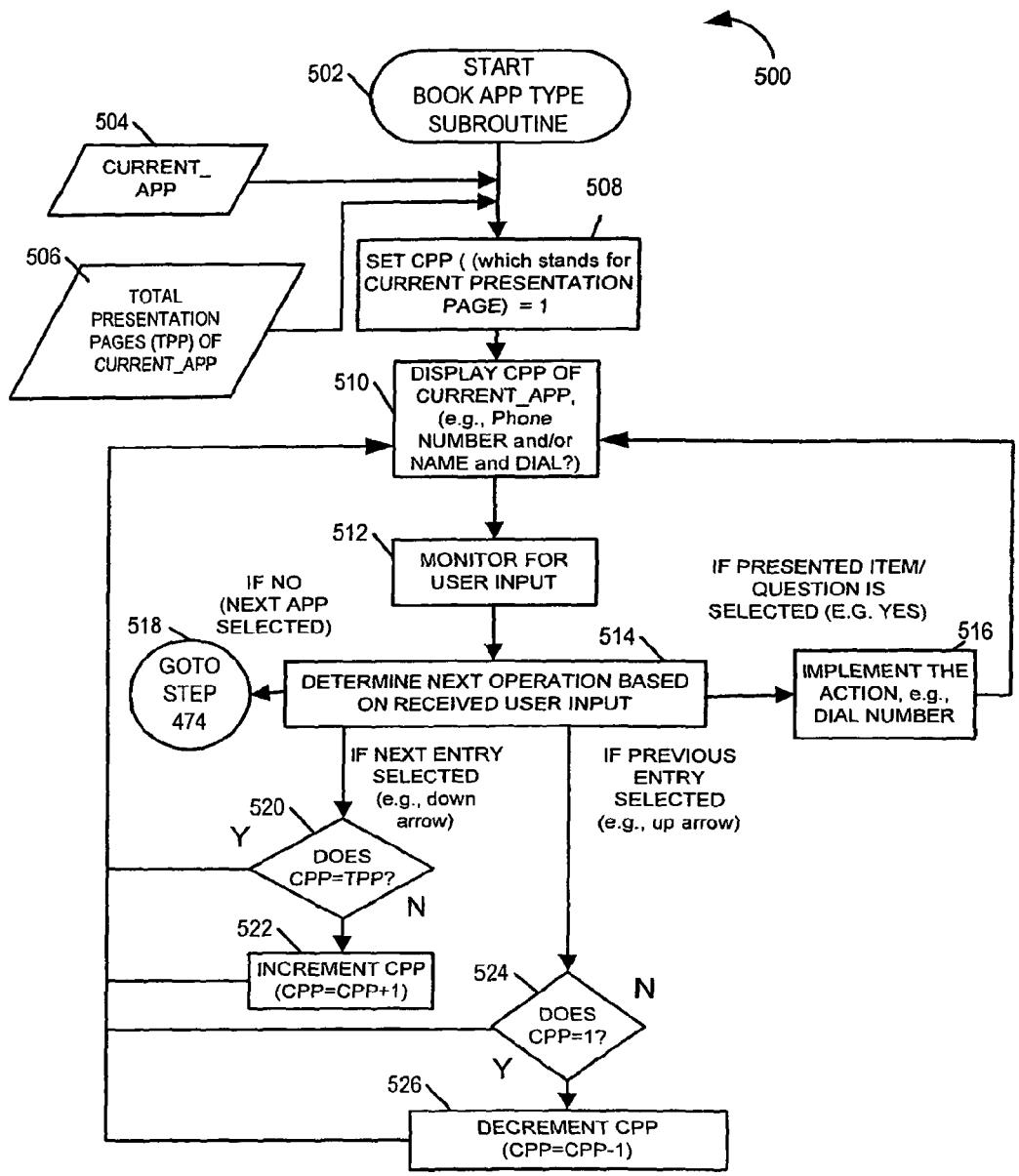
FIG. 5 illustrates a book-type application interface subroutine, which can be used with the UI routine of FIG. 4, implemented in accordance with an exemplary embodiment of the present invention.

FIG. 5 which illustrates an exemplary book application type subroutine 500 which can be used to support various applications which use the book application user interface of the present invention will now be described. The subroutine 500 starts in step 502 when it is executed in response, e.g., to a call from the main user interface because a book type application, e.g., phone book, is to be presented to a user. In step 502, the subroutine instructions begin being executed and the relevant application information is accessed. The information identifying the application to be presented, e.g., in the form of the variable CURRENT_APP 504 is supplied to the subroutine along with an indication of the total number of presentation pages (TPP) 506 in the application to be presented. Next, in step 508 the current presentation page counter CPP is initialized equal to one so that it points to the first page of the application. Operation proceeds from step 508 to step 510.

In step 510, the current presentation page indicated by the value of CPP of the application indicated by the application identifier CURRENT_APP is displayed, and, if a prompt is part of the presentation page, the user is prompted for input. Operation proceeds from presentation step 510 to monitoring step 512 wherein the cell phone's input devices, e.g., navigation and yes/no keys are monitored for input. The book type application interface is designed so that, in response to presentation of any one page, the user is presented with at most 4 response options, no (corresponding to the left arrow), yes (corresponding to the right arrow), forward (corresponding to the down arrow), or backward (corresponding to the up arrow). Step 514, which may be implemented as a case statement, is used to determine which processing path is taken depending on which one of the four possible inputs the user selects.

If the user selects a left arrow indicating a no, operation proceeds to step 518 which results in operation proceeding to step 474 in the main user interface routine. As a result, the CURRENT_APP value will be incremented and the user will be presented with the first page of the next application. Thus, the left arrow/NO serves as a way of moving from the current application to the next application. Detection of a YES input from the user, corresponding to a right arrow selection, results in the action indicated in the prompt which was presented being performed in step 516. In the case of a phonebook application, the action may be, e.g., dialing of the telephone number corresponding to the presentation page being viewed to initiate a call. Once the action is completed, e.g., the call has been placed and allowed to terminate in a normal manner, operation returns to step 510 where the user is again displayed the current presentation page of the CURRENT_APP.

If in step 514, rather then select yes or no, the user selects a down arrow indicating a desire to see the next page in the book type application being displayed, e.g., the next telephone entry in the case of a phonebook application, operation proceeds from step 514 to step 520. In step 520 the current presentation page identifier CPP is compared to the total number of presentation pages to determine if they are equal indicating that the current presentation page is the last page in the book application being presented. If CPP=TPP indicating that there are no more pages to be displayed, the user is returned to step 510 and the last page of the book application is again presented to the user. Thus, a user in the book type application is prevented from moving past the last page as would be the case when a user reaches the last page of a book and can not turn to the next page since one does not physically exist. In some embodiments when the CPP=TPP in a book type application, the down arrow key is not illuminated and is not used to accept input in step 514. However, if in step 520 it is determined that CPP does not equal TPP indicating that there are more pages which can be presented, operation proceeds to step 522 where CPP is incremented by one. Operation then proceeds to step 510 where the next page, indicated by the updated CPP value, is displayed.

If, in step 514, rather than select the next entry, the user indicates a desire to move to the previous presentation page, e.g., entry, in the application, operation proceeds to step 524. In step 524 a check is made to determine if the user is on the first page of the application in which case there are no preceding pages, in terms of the page ordering, to go back to. In step 524, if CPP=1, indicating the user is on the first page of the application, operation proceeds to step 510 where the user is again presented with the first page of the application. In some embodiments, when CPP=1 in a book type application, the up arrow key is not illuminated and is not used to accept input in step 514. However, if in step 524 it is determined that the CPP does not equal 1, indicating that the user is on a higher number page and not the first page of the application, operation proceeds to step 526 where the current presentation page indicator CPP is decremented by one. Operation then proceeds to step 510 where the user is presented with the preceding page in the sequence of book application pages.

As discussed above, by using the NO option, the user can leave the current application and move to another application, which may be an application which is used to provide the user the opportunity to power the device off or put it into a sleep (low power) mode of operation.

An exemplary circular interface subroutine 600 will now be described with reference to FIG. 6. The subroutine 600 is similar to the book type application subroutine 500, but when the last page of an application is encountered, the user is allowed to move to the first page of the application by selecting the next page application. In addition, the user can move to the last page of the application by selecting the previous page when on the first page of the application. This allows a circular movement through the applications pages. Such a presentation interface is well suited for a photo album. As in the book type application a NO input will cause the user to leave the current application and move to the next application while a YES selection will cause the operation associated with the current presentation page to be implemented.

The subroutine 600 starts in step 602 when it is executed in response, e.g., to a call from the main user interface because a circular type application, e.g., photo album, is to be presented to a user. In step 602, the subroutine instructions begin being executed and the relevant application information is accessed. The information 604 identifying the application to be presented, e.g., in the form of the variable CURRENT_APP is supplied to the subroutine along with an indication 606 of the total number of presentation pages (TPP) in the application to be presented. Next, in step 608 the current presentation page counter CPP is initialized equal to one so that it point to the first page of the application. Operation proceeds from step 608 to step 610.

In step 610, the current presentation page indicated by the value of CPP of the application indicated by the application identifier CURRENT_APP is displayed, and, if a prompt is part of the presentation page, the user is prompted for input. Operation proceeds from presentation step 610 to monitoring step 612 wherein the cell phone's input devices, e.g., navigation and yes/no keys are monitored for input. The circular type application interface is designed so that, in response to presentation of any one page, the user is presented with at most 4 response options, no (corresponding to the left arrow), yes (corresponding to the right arrow), forward (corresponding to the down arrow key), or backward (corresponding to the up arrow key). Step 614, which may be implemented as a case statement, is used to determine which processing path is taken depending on which one of the four possible inputs the user selects.

If the user selects a left arrow indicating a no, operation proceeds to step 616 which results in operation proceeding to step 474 in the main user interface routine. As a result, the CURRENT_APP value will be incremented and the user will be presented with the first page of the next application. Thus, the left arrow/NO serves as a way of moving from the current application to the next application. Detection of a YES input from the user, corresponding to a right arrow selection, results in the action indicated in the prompt which was presented being performed in step 622. In the case of a photo album application, the action may be, e.g., displaying a picture or enlarging of a portion of the picture being viewed. Once the action is completed, e.g., a picture has been displayed or the enlarged picture portion has been displayed, operation returns to step 610 where the user is again displayed the current presentation page of the CURRENT_APP. In the case of a music library application, the action may be, e.g., playing a song.

If, in step 614, rather then select yes or no, the user selects a down arrow indicating a desire to see the next page in the circular type application being displayed, e.g., the next photo in the album, operation proceeds from step 614 to step 618. In step 618 the current presentation page identifier CPP is compared to the total number of presentation pages to determine if they are equal indicating that the current presentation page is the last page in the book application being presented. If CPP=TPP indicating that the user is on the last page, operation proceeds to step 624 where CPP is set equal to 1. This causes the current presentation page to correspond to the first page thereby achieving a wrapping around operation from the last to the first page in response to the next page being selected when the user was on the last page. Operation proceeds from step 624 to step 610 where the current page, now the first page is displayed.

If in step 618 it is determined that CPP does not equal TPP indicating that there are still more pages, e.g., photos to be displayed, CPP is incremented by one in step 626 and then proceeds to step 610 where the next page indicated by the updated CPP value is displayed.

If in step 614, rather than select the next entry, the user indicates a desire to move to the previous presentation page, e.g., entry, in the application, operation proceeds to step 620. In step 620 a check is made to determine if the user is on the first page of the application in which case there are no preceding pages, in terms of the page ordering, to go back to. However, being a circular application, the user can, and is directed from the first presentation page to the last presentation page. Accordingly, from step 620 operation proceeds to step 628 in the case where CPP=1. In step 628, CPP is set equal to TPP and then operation proceeds to step 610 where the last presentation page corresponding to the set of application pages will now be displayed. However, if in step 620 it is determined that CPP does not equal 1, indicating that there are earlier pages, e.g., photos, which can be displayed, operation proceeds from step 620 to step 630. In step 630, CPP is decremented by one and then operation proceeds to step 610 where the presentation page corresponding to the decremented page indicator is displayed.

Thus, it is possible to implement a circular type application interface where a user is presented with, at most, four navigation operations after presentation of a page.

Figure 6:
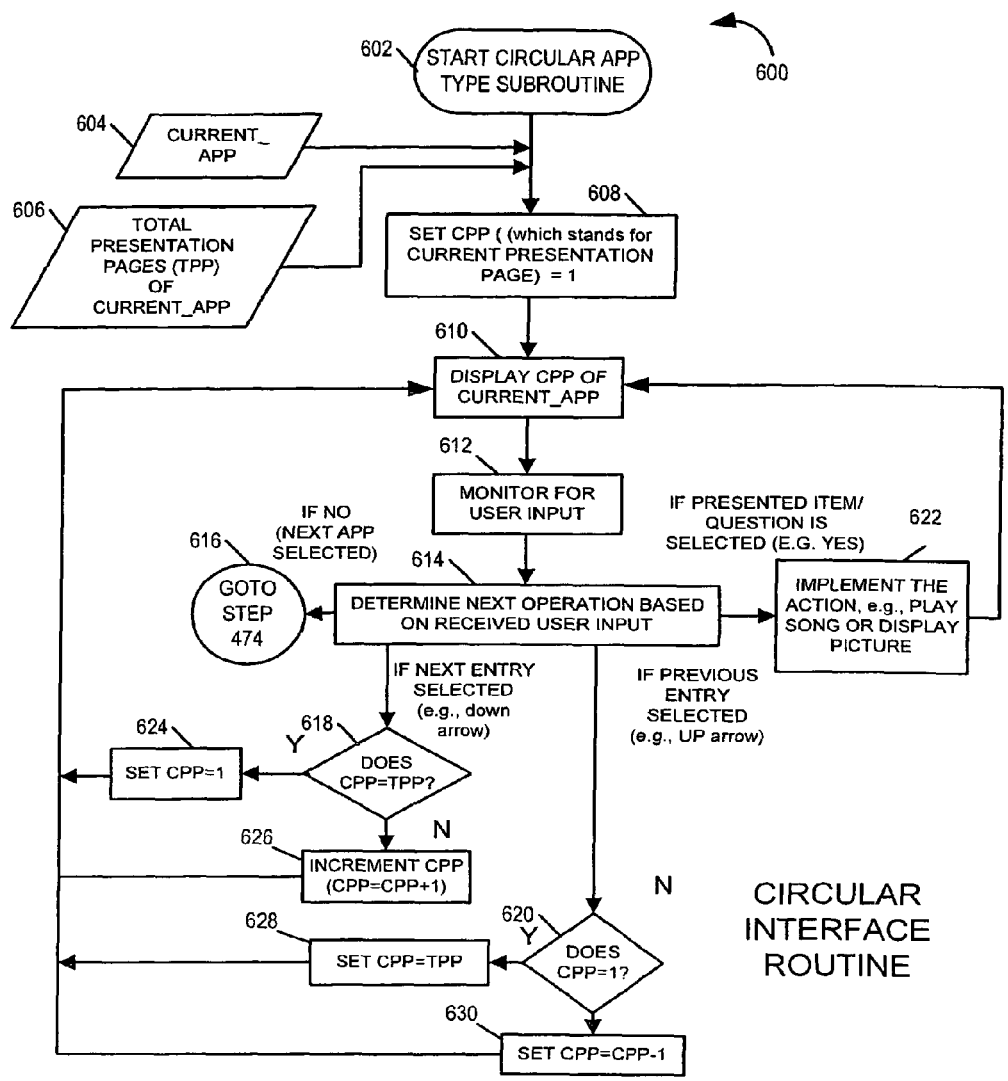
FIG. 6 illustrates a circular application interface subroutine, which can be used with the UI routine of FIG. 4, implemented in accordance with an exemplary embodiment of the present invention.
Figure 7:
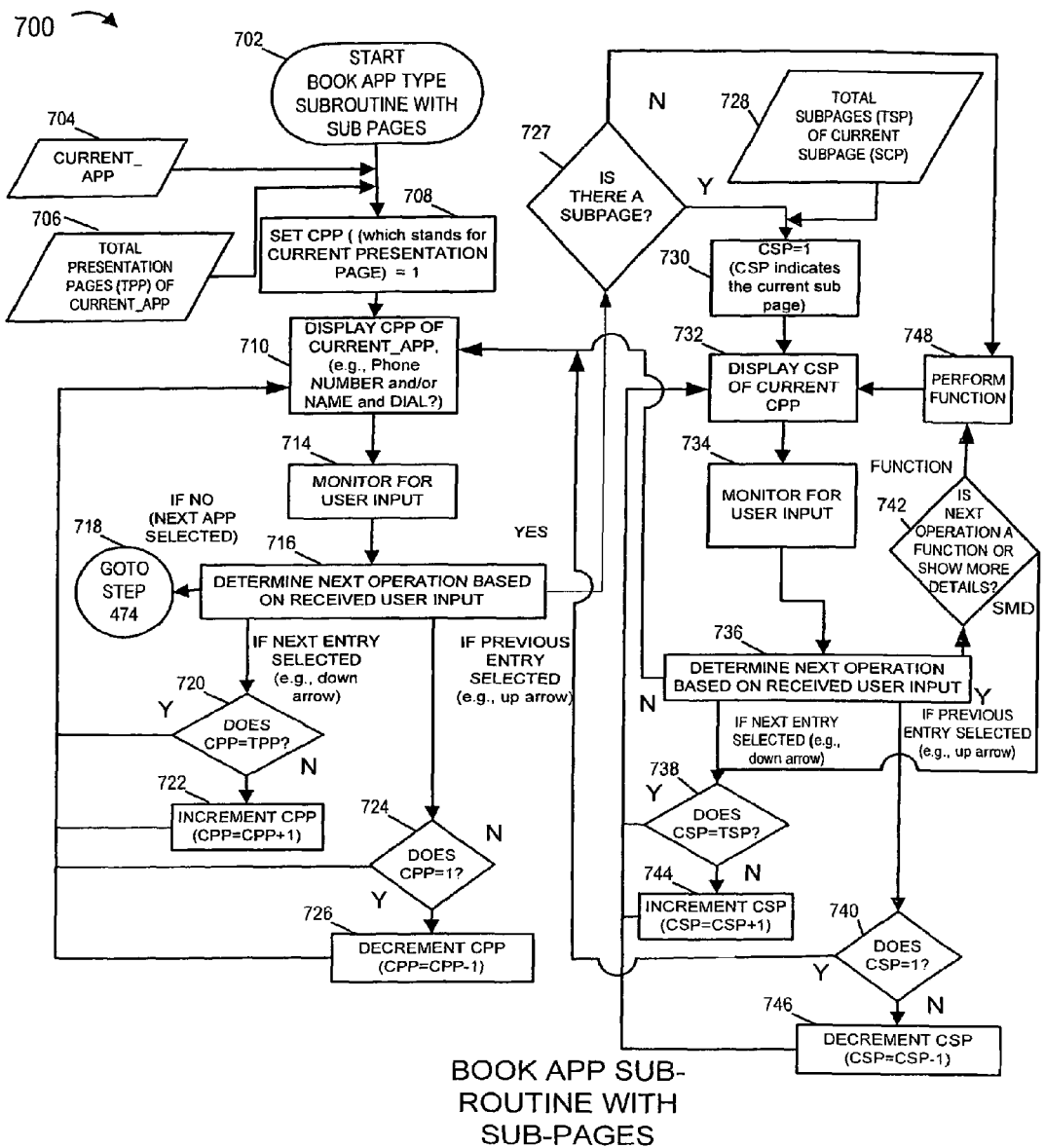
FIG. 7 illustrates a book application type interface subroutine with sub pages implemented in accordance with the invention.

Sub-page functionality can be added to either the book type application interface of FIG. 5 or the circular type application interface of FIG. 6, to allow a user to move to a subpage and obtain further details or related information corresponding to the main page. FIG. 7 illustrates an exemplary book type subroutine 700 which supports subpages. The left portion of the subroutine 700 of FIG. 7 is similar to the functionality already described with regard to FIG. 5. However, the right portion of the subroutine 700 has been enhanced to provide support for subpages.

The subroutine 700 starts in step 702 when it is executed in response, e.g., to a call from the main user interface because a book type application, e.g., phone book with subpages, is to be presented to a user. In step 702, the subroutine instructions begin being executed and the relevant application information is accessed. The information identifying the application to be presented, e.g., in the form of the variable CURRENT_APP 704 is supplied to the subroutine along with an indication of the total number of presentation pages (TPP) 706 in the application to be presented. Next, in step 708 the current presentation page counter CPP is initialized equal to one so that it points to the first page of the application. Operation proceeds from step 708 to step 710.

In step 710, the current presentation page indicated by the value of CPP of the application indicated by the application identifier CURRENT_APP is displayed and, if a prompt is part of the presentation page the user is prompted for input. Operation proceeds from presentation step 710 to monitoring step 714 wherein the cell phone's input devices, e.g., navigation and yes/no keys are monitored for input. The book type application interface is designed so that, in response to presentation of any one page, the user is presented with at most 4 response options, no (corresponding to the left arrow), yes (corresponding to the right arrow), forward (corresponding to down arrow), and backward (corresponding to up arrow).

Step 716, which may be implemented as a case statement, is used to determine which processing path is taken depending on which one of the four possible inputs the user selects.

If the user selects a left arrow indicating a no, operation proceeds to step 718 which results in operation proceeding to step 474 in the main user interface routine. As a result, the CURRENT_APP value will be incremented and the user will be presented with the first page of the next application. Thus, the left arrow/NO serves as a way of moving from the current application to the next application. Detection of a YES input from the user, corresponding to a right arrow selection, results in operation proceeding to step 727 in which it is determined if there is a subpage corresponding to the current page. If there is no subpage, operation proceeds directly to step 748 where the function corresponding to the page which was being displayed is performed. However, if there is a subpage corresponding to the current page, a yes input results in operation proceeding to step 730. In step 730, the current subpage indicator value CSP is initialized to 1. Then, in step 732, the subpage corresponding to the value CSP, of the current presentation page, CPP, is displayed. Operation proceeds from subpage display step 732 to step 734 where monitoring for input from the user is performed. Next, in step 736 the next operation is determined based on the received user input.

As in the case of step 716, the user input may be one of four input selections, no, yes, up, down where up is used to indicate a request for a previous subpage and down is used to indicate a request for the next subpage. If the input indicates a no input, operation proceeds from step 736 back to step 710 where the current presentation page CPP of the current_app is displayed. However, if in step 736 a yes input is received operation proceeds to step 742. In step 742, a determination is made, e.g., based on the prompt that was presented to the user, as to whether the yes indicates that a function is to be performed or if the yes should be interpreted as a request to show more details, e.g., another subpage. If the yes is determined to correspond to a function operation proceeds to step 748 where the function is performed prior to operation returning to display step 732. However, if the yes input is determined to correspond to a request to show more details, operation proceeds from step 742 to step 738.

Operation will proceed directly from step 736 to step 738 when the user selects a next entry as the input. In step 738, a determination is made as to whether CSP=TSP. Thus, in step 738 a determination is made as to whether the current subpage indicator value corresponds to the total number of subpages of the current presentation page. Thus, a check is made in step 738 to see if there are any remaining subpages corresponding to the current presentation page which can be displayed. If theres ar no more subpages, CSP will be equal to TSP and operation will proceed from step 738 to display current subpage step 732 where the last subpage will be displayed again. However, if in step 738 it is determined that there are additional subpages, operation proceeds to step 744 where CSP is incremented by one before operation proceeds to step 732 and the subpage corresponding to the updated CSP value is displayed.

If in step 736 it is determined that the user has selected the previous subpage by activating the up arrow, operation proceeds to step 740 which CSP is compared to 1 to determine if the current subpage is the first subpage corresponding to the current page. If it is determined that CSP=1 operation proceeds to step 710 where the user is returned to the display of the current present page indicated by the value CPP. However, if in step 746 it is determined that CSP is not equal to 1, CSP is decremented and operation returns to step 732 where the subpage indicated by the updated CSP value is displayed.

If in step 716, rather then select yes or no, the user selects a down arrow indicating a desire to see the next page in the book type application being displayed, e.g., the next telephone entry in the case of a phonebook application, operation proceeds from step 716 to step 720. In step 720 the current presentation page identifier CPP is compared to the total number of presentation pages to determine if they are equal indicating that the current presentation page is the last page in the book application being presented. If CPP=TPP indicating that there are no more pages to be displayed, the user is returned to step 710 and the last page of the book application is again presented to the user. Thus, a user in the book type application is prevented from moving past the last page as would be the case when a user reaches the last page of a book and can not turn to the next page since one does not physically exist. However, if in step 720 it is determined that CPP does not equal TPP indicating that there are more pages which can be presented, operation proceeds to step 722 where CPP is incremented by one. Operation then proceeds to step 710 where the next page, indicated by the updated CPP value, is displayed.

If, in step 716, rather than select the next entry, the user indicates a desire to move to the previous presentation page, e.g., entry, in the application, operation proceeds to step 724. In step 724 a check is made to determine if the user is on the first page of the application in which case there are no preceding pages, in terms of the page ordering, to go back to. In step 724, if CPP=1, indicating the user is on the first page of the application, operation proceeds to step 710 where the user is again presented with the first page of the application. However, if in step 724 it is determined that the CPP does not equal 1, indicating that the user is on a higher number page and not the first page of the application, operation proceeds to step 726 where the current presentation page indicator CPP is decremented by one. Operation then proceeds to step 710 where the user is presented with the preceding page in the sequence of book application pages.

Thus, the book type application subroutine 700 which supports subpages operates in a manner similar to the basic book type application described with reference to FIG. 5 but has the additional advantage of supporting the presentation of subpages.

Having described various user interface features, we will now turn to discussing novel ways of updating the information and functions of the cell phone 100 in a novel manner that takes advantage of conventional SMS messages to update the cell phone.

Figure 8:
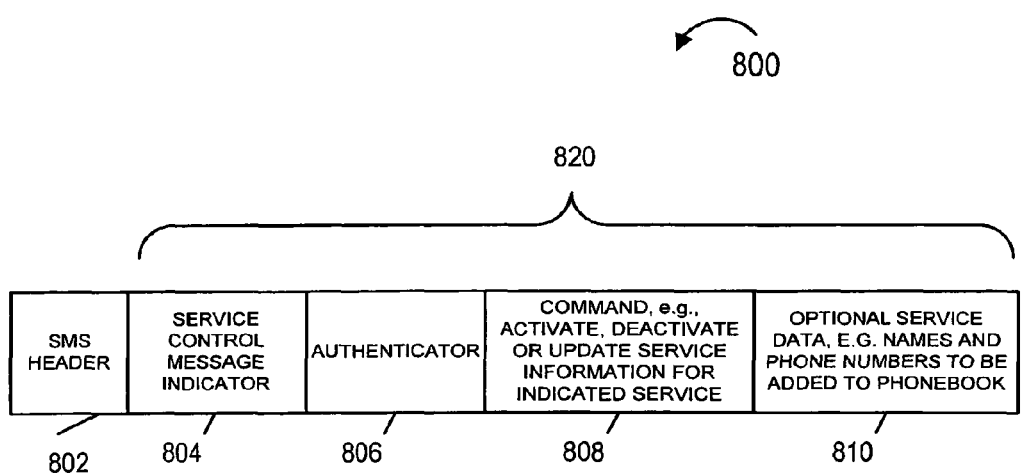
FIG. 8 illustrates a short message service (SMS) message processing routine implemented in accordance with the invention which can be used to update information and/or device functionality in accordance with the invention.

SMS headers are permitted to include some values which can be determined by the network provider. Unfortunately, different network providers sometimes assign different meanings and/or have already assigned certain values for a particular application. Since the discretionary SMS header bits which are available for use are not interpreted or used consistently across all networks, problems may arise by trying to use these bits to indicate that a device update message is being sent to a cell phone. Thus, while in some embodiments an indicator is included in the message header to indicate a device update message, in other embodiments where roaming may occur, the SMS header is not used to convey the information that a device update message is being sent. Instead, in some such embodiments of the invention which are intended for wide spread use where roaming is contemplated, a service control message indicator 804 is included in the body 820 of an SMS message 800 as shown in FIG. 8. The service control message indicator 804 may be included at a predetermined location in the body such as at the start of the body of the message.

Thus, in some embodiments, SMS message based updating feature uses a novel SMS message which is fully compliant with existing SMS message definitions and protocols. An exemplary SMS message 800, implemented in accordance with the present invention, is shown in FIG. 8. The message 800 includes a conventional SMS header 802 and a body 820 which corresponds to the conventional payload text portion of an SMS message. The body 820 includes a service control message indicator 804, authenticator 806, command 808 indicating an operation to be performed, and optional service data 810 which may be omitted. It should be appreciated that the service control message indicator 804 may be omitted with the command 808 serving as the service message indicator. That is, it is possible to search the SMS message 800 for an update command and, based on its presence, determine that the SMS message is an update control message. The header 802 identifiers the user/device for which the message is intended. The service control message indicator 804 is a set of information, e.g., an alphanumeric string, which indicates that the message is a service control message intended to update device functionality and/or application related information. The authenticator 806 is used to indicate that the message is from an entity which is authorized to update the cell phone 100 to which the message 800 is directed. Different authenticators can be used to identify different entities which may issue updates, with different entities have different amounts of authority to authorize or otherwise command an update. Various know authentication techniques may be used to generate the authenticator and to verify that the authenticator is valid, e.g., authentic.

The command 808 in the message will be implemented assuming a security check is satisfied, e.g., the authenticator 806 when checked indicates the message is authentic and has been sent by an entity with authority to instruct the cell phone to implement the operation indicated by the command. The command may instruct the cell phone to activate, deactivate a service, application or function. In addition, the command 808 may instruct the cell phone to update information associated with a particular application identified in the command, e.g., update a phone book application with new or revised phone book entries. The update may involve, e.g., initiating communication with a server or other device through a base station and downloading application code and/or information to be loaded into the cell phone. Alternatively, the information or data corresponding to a service that is to be used in the update may be included directly in the SMS message in optional service data 810 thereby eliminating the need to contact another device to retrieve the information. The option information 810 may include, e.g., names and telephone numbers to be added to a phone book, files corresponding to photos to be added to a photo album or actual executable code to be used in updating an application, service or function that is performed or provided by the cell phone 100.

In some embodiments, the command and/or optional service data are encrypted to provide both privacy and a further level of security. The information in 810, when encrypted, is decrypted before implementation of the command and/or use of the optional service data, e.g., information, 810.

As will be discussed below, in response to receiving an SMS message and before displaying the contents of the message, the cell phone 100 of the present invention checks the header and/or body of the message for a service control message indicator to determine if it is the received message is a regular SMS message to be displayed or if the SMS message is a service update message which should be processed in accordance with the invention. Processing in accordance with the invention may include, checking the message authenticator, decrypting portions of the message and then, assuming successful authentication and/or decryption, updating the service, function or information in the cell phone with or without notifying the user of the receipt of the message.

Figure 9:
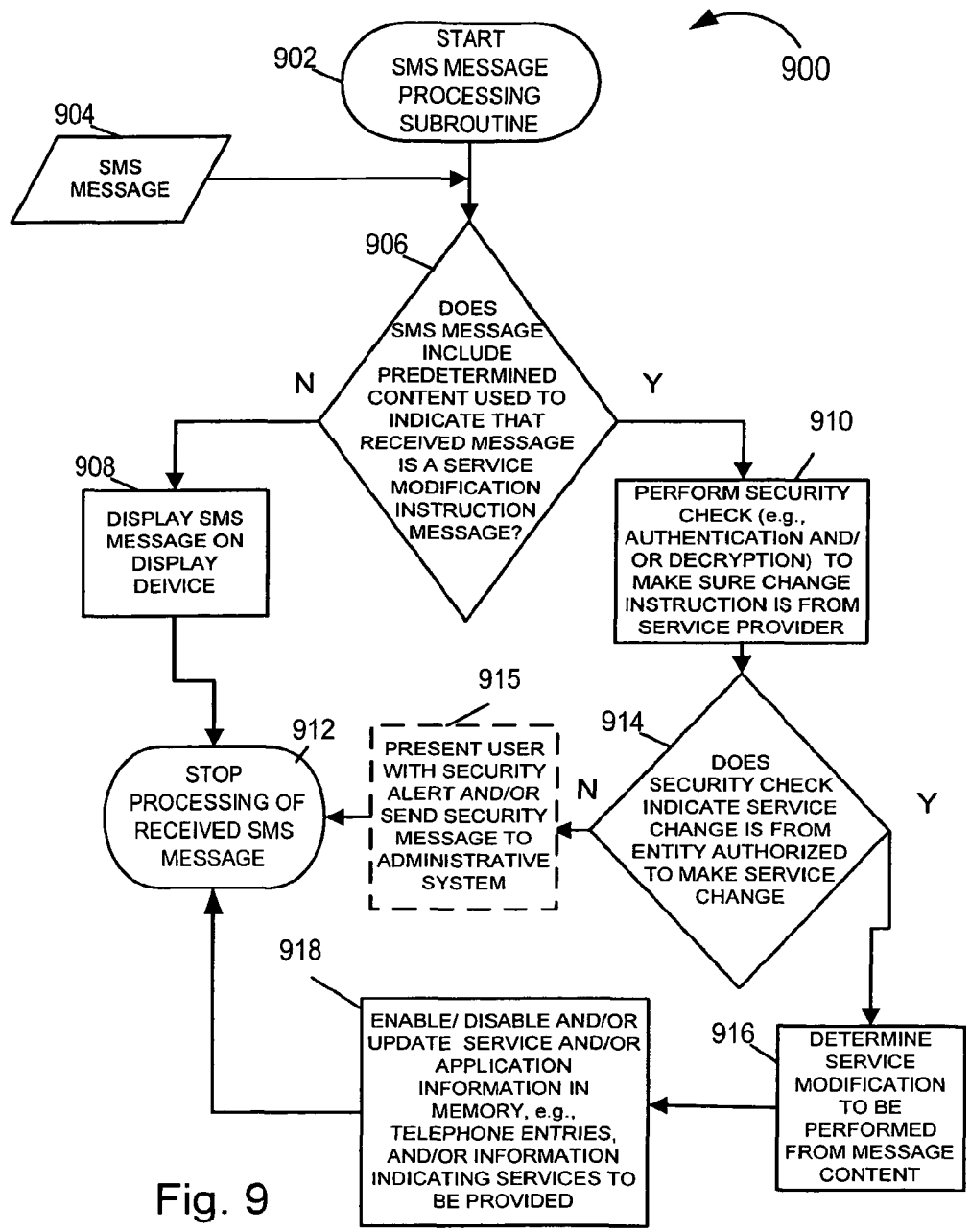
FIG. 9 illustrates an exemplary SMS message which can be used in accordance with the invention to update communications device functionality and/or information.

FIG. 9 illustrates an exemplary SMS message processing subroutine 900 which is responsible for processing SMS messages in accordance with the present invention. Each received SMS message may be a conventional text message including a body with text intended to be displayed to the user or may be an SMS service update message of the present invention such as the message 800 illustrated in FIG. 8. The SMS message processing routine 900 may be called from the main UI routine 400 in response to an SMS message being received.

In step 902, the SMS routine is initialized and begins processing of the received SMS message 904. Next, in step 906 the SMS message is examined to determine if it includes predetermined content used to indicate that the received message is a service control message. This may involve checking the header of the message for a predetermined indicator used to indicate that the message is a service control message. However, it can and in various embodiments does involve checking the body portion of the message for a predetermined indicator used to indicate that the message is a service control message as opposed to a conventional message intended to be displayed to the user of the device.

If, in step 906, it is determined that the SMS message does not include an indicator that indicates that it is a service control message, it is interpreted as a regular SMS message and operation proceeds to step 908 wherein the message is displayed on the cell phone's display device as a conventional text message. Processing then proceeds to step 912 where the processing of the received message stops. However, in step 906, if it is determined that the received message includes a control message indicator, e.g., either in the body of the message or the header, operation proceeds to step 910 wherein a security check is performed. The security check involves performing an authentication operation and/or a decryption operation. The authentication operation is used to check authenticity of an authenticator 806 included in the received message. In addition or as an alternative to using an authenticator, all or a portion of the message body may be encrypted. In such a case, the security operation includes a decryption operation. When performed, if either the authentication operation or decryption operation fails, it is considered a failure of the security check and is indicative that the message was from an entity which was not authorized to send a service control message to the device 100. If the security check fails in step 914, operation proceeds to step 912 and processing of the received SMS message stops. However, in some embodiments an alert is sent to the user, in the form of a displayed warning message, and/or to a system administrator, e.g., via an SMS alarm message. This occurs in optional step 915 which occurs between steps 914 and 912 in those cases where such an alert feature is implemented.

In step 914 if the security check has not failed, e.g., the authentication and/or decryption operations were successful, operation proceeds to step 916. In step 916, the service modification to be performed is determined from the message content, e.g., the contents in the command and/or service data fields. Then, in step 918 the service operation is implemented, e.g., the command is executed and the service or application is enabled, disabled or updated as instructed. Updating may involve loading one or more phonebook or other data entries included in the optional service data 810 into memory for use in providing a service.

As discussed above, the SMS service update message 800 includes in the body 820 a service control indicator 804, an authenticator 806, a command 808 indicative of an action to be performed such as activate, deactivate, or update service information for the device to which the message was addressed. In addition, the message may include optional service data 810, e.g., entries such as names and/or phone numbers to be used as pages in a phone book, images to be added to a photo album or other information. In some embodiments this information is entered in a computer system, e.g., server which is accessible via the Internet. The server is used to provide a device update service to users of cell phones 100 and/or to other individuals that a cell phone user may authorize. For example, a senior citizen, who is a cell phone user, may designate a younger family member more familiar with computers to perform his or her updates, e.g., add new entries into the phone book. A user or designated individual may login to a cell phone service account on the server, and supply information to be used, e.g., added or removed from his/her phonebook. The server then formats the information and sends it to the cell phone corresponding to the user seeking to update his/her information in a message that includes the service control message indicator 804 and any command required to implement the update operation. The server is also responsible for including a valid authenticator 806 used to indicate that the sender of the SMS message is an entity authorized to update the information and/or features of the cell phone to which the message was directed. In addition, for added security the server may encrypt all or a portion of the message using a secure key known to the cell phone and server. In this manner, through the use of encryption added security can be achieved.

In the above described manner, users and/or individuals designated by the users, such as relatives who supplied the phone to the user, can update the information and services offered by the cell phone 100 via a Web browser and simple to use menus and a full sized computer keyboard. Thus, use of a small physically constrained keypad of a telephone to enter names and phone number information can be avoided and the space normally used for such keys can be dedicated to making the remaining keys on the keypad relatively large.

Figure 15:
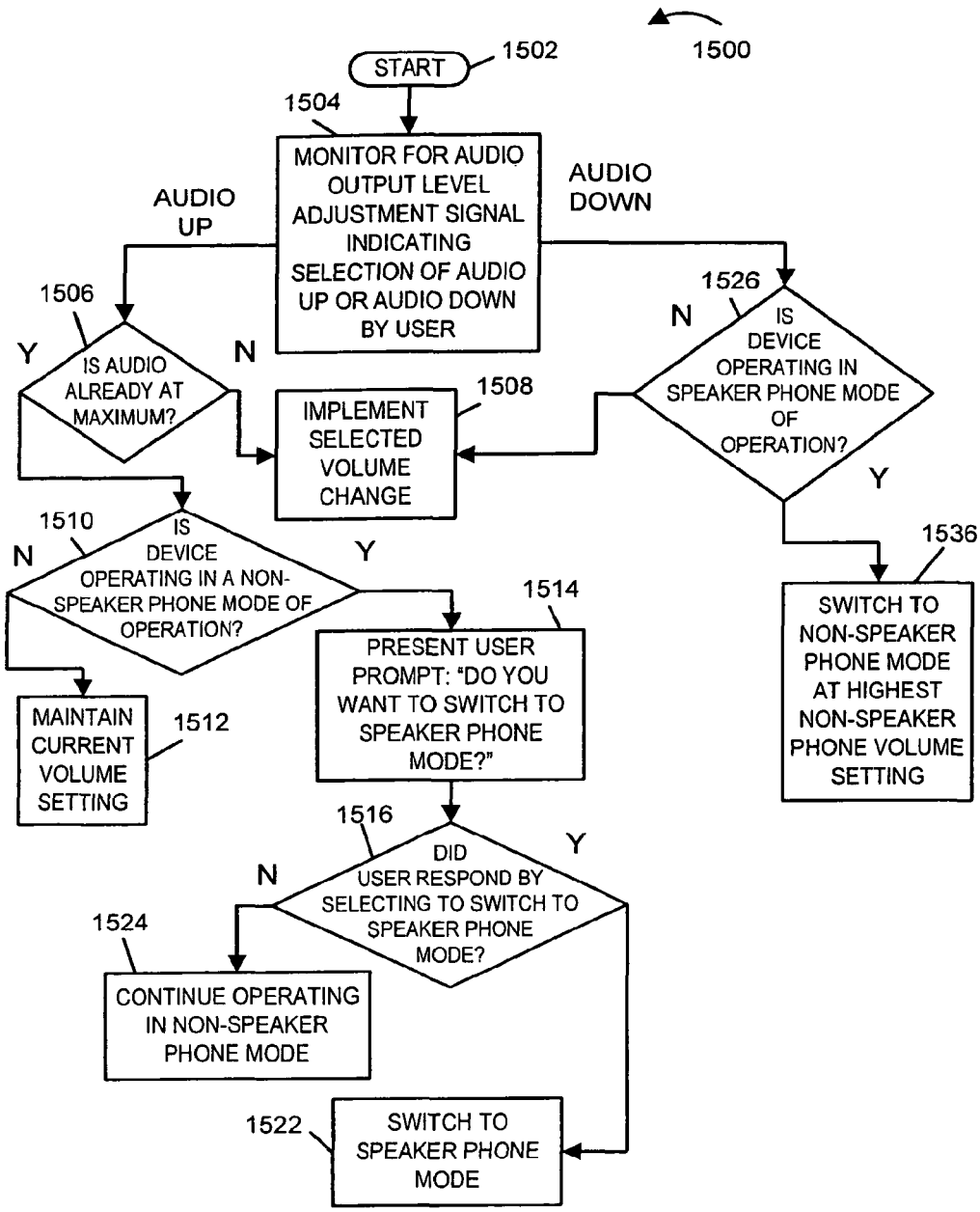
FIG. 15 illustrates an exemplary method for controlling device volume and for controlling switching between speakerphone and non-speakerphone modes of operation.

Referring now to FIG. 15, it should be appreciated that this figure illustrates an exemplary method 1500 for controlling device volume and for controlling switching between speakerphone and non-speakerphone modes of operation. In the exemplary method which may be implemented by a wireless terminal, e.g., cell phone, the user of the device is offered an opportunity to switch between a non-speakerphone mode of operation and a speakerphone mode of operation when the user continues to press or presses the up volume button when the volume of the cell phone is already set to maximum.

If the user responds affirmatively to the prompt asking if the user wants to switch to speakerphone mode, the cell phone will transition from the non-speakerphone mode of operation to the speakerphone mode of operation. Confirmation of an indication to switch is required in some embodiments before the change between modes is made.

In particular embodiments, a single volume setting is supported in speakerphone mode. In one particular embodiment, attempts to lower the volume in speaker phone mode cause a transition to non-speakerphone mode with the volume being set to the highest supported non-speakerphone mode volume level.

The method 1500 begins in start step 1502, wherein a routine corresponding to the method 1500 is implemented by the processor of the wireless user device, e.g., cell phone 100.

Operation proceeds from start step 1502 to step 1504 wherein, the device monitors for an audio output level adjustment signal, e.g., a signal generated by pressing a volume up or volume down arrow key. Operation proceeds to step 1506 if an audio up user selection is detected. In step 1506 the current volume setting is checked to determine if the volume is already set to maximum. If the volume is not set to maximum, operation proceeds to step 1508 where the up or down volume adjustment which was indicated by the user is implemented.

If in step 1506 it is determined that the audio level is already at maximum, operation proceeds to step 1510. In step 1510, a determination is made as to whether or not the device is operating in speaker phone mode. If the device is operating in speakerphone mode, operation proceeds to step 1512 in which the current, e.g., maximum, volume setting is maintained. If however the device is operating in non-speaker phone mode, operation will proceed from step 1510 to step 1514.

In step 1514 the user is presented with a prompt inquiring if the user wants to switch to speaker phone mode. Thus, the user is presented with the option of switching to speakerphone mode in response to pressing the volume up arrow when the volume is already set to maximum and the device is in non-speakerphone mode operation.

In step 1516, the response to the prompt provided in step 1514 is checked to determine if the user selected to switch to speaker phone mode operation. If in step 1516 it is determined that the user selected to switch into speaker phone mode operation, e.g., by pressing a Yes key, operation proceeds to step 1522 in which the device switches into speakerphone mode operation from non-speakerphone mode operation.

Operation will proceed directly from step 1516 to step 1524 when the user responds negatively to the prompt asking if the user wants to switch to speakerphone mode operation. In step 1524 the device continues to operate in non-speakerphone mode, e.g., with the audio output level being left unchanged since it is already set a maximum.

In step 1504 if a signal indicating an attempt to decrease volume was detected, operation proceeds from step 1504 to step 1536 wherein the device switches to non-speaker phone mode operation at the highest supported non-speaker phone volume setting. Thus in some embodiments, when in speakerphone mode operation, a decrease volume command can trigger a switch to non-speaker phone mode operation.

Note that while a confirmation to switch to speakerphone mode operation is required in some embodiments, in at least some of those embodiments a confirmation of a desire to transition to non-speaker phone mode is not required before implementing the transition. This is permitted, because an unintentional switch to speakerphone mode may result in public embracement or unwanted overhearing of a conversation while an unintentional switch to non-speaker phone mode operation tends to have less significant consequences, e.g., perhaps the inability to hear a few words before the change in modes of operation can be addressed.

It should be appreciated that the monitoring in step 1504 is performed on an ongoing basis with each press of the volume control button or continued pressing of the volume control button resulting in the receipt of one or more volume adjustment commands which are processed in the described manner.

Figure 16:
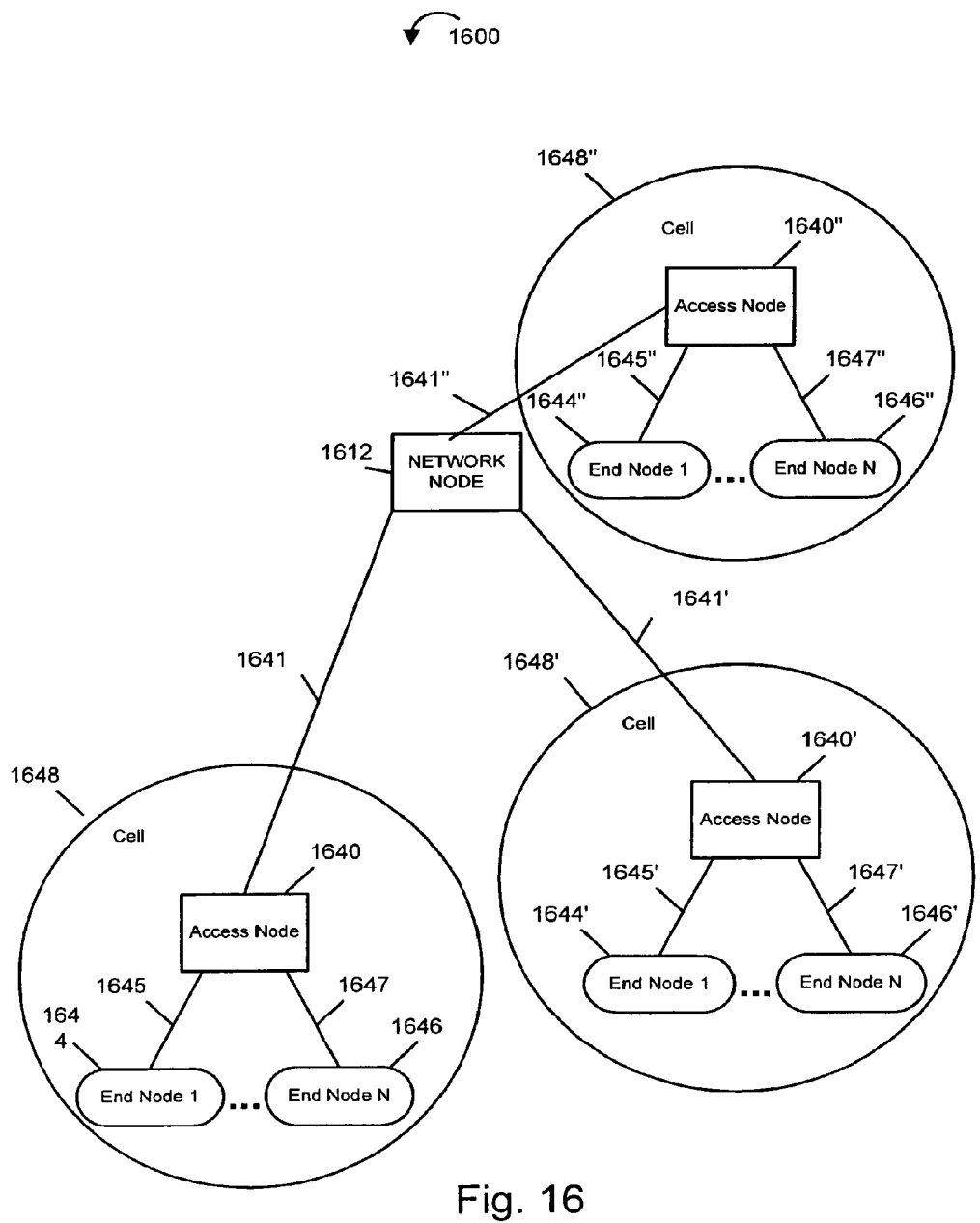
FIG. 16 illustrates a system implemented din accordance with the invention in which text messages, e.g., SMS text messages transmitted over an air link can be used to update portable communications devices.

FIG. 16 illustrates an exemplary system 1600 of the present invention in which one or more devices can generate a device update message, e.g., an SMS update message of the present invention, and direct it to a device, e.g., end node, to be updated.

As illustrated, the exemplary system 1600 includes a plurality of cells 1648, 1648', 1648" which are coupled together by one or more network nodes 1612 and links 1641, 1641' and 1641". The links 1641, 1641', 1641" may be implemented using, e.g., fiber optic, wire cables or other methods. The network nodes may be implemented as servers which forward messages, e.g., in the form of IP packets, between the various cells for deliver to end nodes, e.g., wireless terminals.

Each cells 1648, 1648' and 1648" each includes at least one base station in the form of an access node 1640, 1640', 1640" and one or more end nodes (1644, 1646), (1644', 1646'), and (1644", 1646"). Since the access nodes 1640, 1640' and 1640" are part of the network, they may be viewed as a particular type of network node. The end nodes may be implemented as wireless communications devices, e.g., cell phones in accordance with the invention. As discussed above, SMS messages may be sent to the end nodes to update them. In accordance with the invention, one or more network nodes are authorized to generate SMS update messages used to update end nodes in accordance with the invention. Other nodes, e.g., end nodes and/or other network nodes may generate and send conventional SMS messages. As a security measure, one or more network devices responsible for communicating SMS messages check to determine if an SMS message is a device update message or a convention message. If it is a device update message, a further check is made to make sure that the source of the message is authorized to generate such messages. The source, e.g., a trusted server, may have a fixed IP addresses from which SMS update messages are sent. As part of the security procedure, SMS update messages sent from sources which do not have IP addresses which are on a list of addresses corresponding to authorized update messages will be dropped. Conventional SMS messages which do not result or trigger device updates are forwarded in the usual manner.

Thus, in accordance with the invention, network node 1612 may be implemented as an SMS message server which receives and forwards SMS messages. Server 1612 drops SMS messages which are determined to be device update messages that are not from sources authorized to send such messages, e.g., another network node coupled to server 1612, which is responsible for generating SMS device update messages in accordance with the invention. The same or similar check may be performed in individual base stations 1640, 1640', 1640" with the base station dropping SMS device update messages which are from sources which are not known to the base station as being authorized to send such messages.

Figure 17:
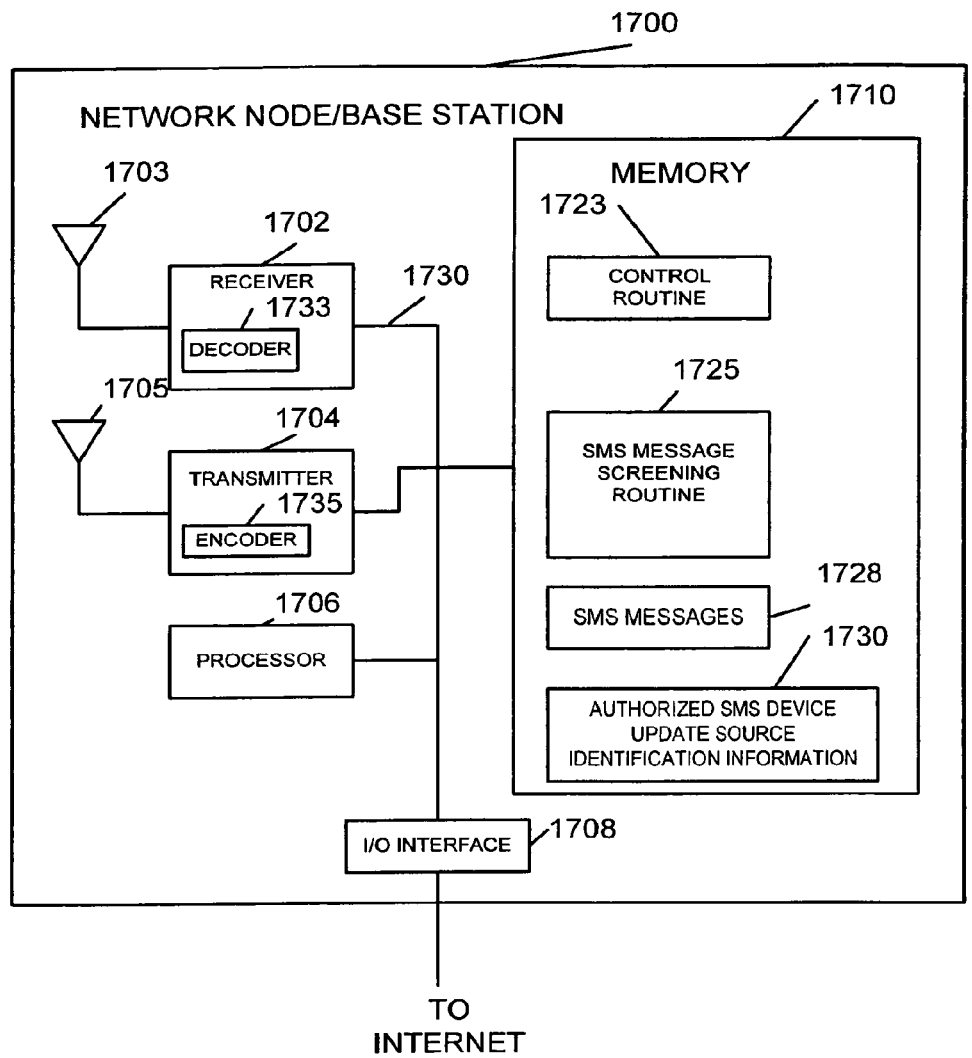
FIG. 17 illustrates an exemplary device, e.g., a network node which may be, e.g., a sever used to forward SMS text messages, base station and/or other node which may be used in the system of FIG. 16 to generated and/or forward update messages, e.g., SMS text bases update of the invention.

FIG. 17 illustrates a network node/base station 1700 implemented in accordance with the invention which performs SMS device update message checks as described with respect to FIG. 16. The node 1700 includes a receiver antenna 1703 and receiver module 1702 for receiving communications via the air. The receiver 1702 includes a decoder 1733 for decoding received communications. The node 1700 also includes a transmitter antenna 1705 and a transmitter 1704. The transmitter includes an encoder 1735 for encoding signals prior to transmission over the antenna 1705. The receiver 1702, transmitter 1704 are coupled by a bus 1730 to a processor 1706, I/O interface 1708 and memory 1710. The I/O interface coupled the node 1700 to other network nodes via, e.g., the Internet or another connection.

The memory 1701 includes a control routine 1723 for controlling general operation of the node 1700, an SMS message screening routine 1725, SMS messages 1728 and authorized SMS device update source identification information 1730. The SMS message screening routine 1725, when executed by processor 1706, causes the processor to check received SMS messages to determine if they are device update messages. If the messages are device update messages, information identifying the source of the message is compared to information indicating authorized sources of device update messages. Such information may include static IP addresses or other identifiers of authorized sources of device update messages. If a device update message is determined to be from an authorized source of such messages, the message is forwarded otherwise the SMS device update message is dropped as a security precaution. SMS messages which are found not to be device update messages, e.g., messages which do not include a command or something to identify them as an update message, are forwarded for delivery in the normal manner. Thus, SMS device update messages will be screened as a security precaution but SMS messages which do not trigger device updates are handled, e.g., forwarded without being subjected to the full set of security measures to which device update messages are subjected.

Such a simple screening procedure greatly reduces the risk of end users sending device update messages to one another with the intent of causing system problems. This approach works because most or all end users are not identified as authorized sources of SMS device update messages and device update messages sent from unauthorized end users will therefore be dropped prior to delivery to the targeted device.

While described in the context of a cell phone system, the methods and apparatus of the present invention are applicable to a wide range of communications systems including systems which support one or more of a wide range of communications devices including PDAs and other portable communications devices as well as cell phones.

In various embodiments elements described herein are implemented using one or more modules to perform the steps corresponding to one or more methods of the present invention, for example, SMS message generation and/or SMS message processing. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices. Accordingly, among other things, the present invention is directed to a machine-readable medium including machine executable instructions for causing a machine, e.g., processor and associated hardware, to perform one or more of the steps of the above-described method(s). Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, and/or various other types of communications techniques which may be used to provide wireless communications links between base stations and mobile nodes such as cell phones. In various embodiments the present invention is used with notebook computers, personal digital assistants (PDAs), or other portable devices including receiver/transmitter circuits and logic and/or routines, for implementing the methods of the present invention.

What is claimed is:

1. A method of operating a portable communications device to perform an update operation, the method comprising:
    receiving an SMS message including a header portion and a message body portion;
    determining if the message body portion of the SMS message includes an indicator used to indicate that the message is an update message; and
    if the SMS message is an update message, performing an update operation as a function of the content of the body portion of said received SMS message without displaying the full content of the body portion of said SMS message, said performing an update operation including performing an operation indicated by a command included in said message body portion;
        if said SMS message body portion is determined not to include said indicator, displaying a text message included in said received SMS message to a user of said device;
    wherein said portable communication device is a cell phone; and
    wherein said message body portion includes service data in addition to said command.

2. The method of claim 1, wherein performing said update operation includes:
    loading at least some of said service data into memory.

3. The method of claim 1 wherein said command serves as said indicator.

4. The method of claim 1, wherein said cell phone includes a lid in which a display is mounted.

5. The method of claim 1, wherein said update operation includes programming a button on said communication device to correspond to a telephone number.

6. The method of claim 1, further comprising:
    making an SMS message inbox placement decision based on whether or not said SMS message includes said indicator used to indicate that the message is an update message.

7. The method of claim 6, wherein said inbox placement decision is a decision on whether or not to include said SMS message in said inbox.

8. A communications device comprising:
    a receiver configured to receive an SMS message including a header portion and a message body portion; and
    a processor configured to control the communications device to:
        determine if the message body portion of the SMS message includes an indicator used to indicate that the message is an update message;
        perform, if the SMS message is an update message, an update operation as a function of the content of the body portion of said received SMS message without displaying the full content of the body portion of said SMS message, said update operation being indicated by a command included in said message body portion;
        display, if said SMS message body portion is determined not to include said indicator, a text message included in said received SMS message to a user of said device;
    wherein said communications device is a cell phone; and
    wherein said message body portion includes service data in addition to said command.

9. The communications device of claim 8, further comprising:
    a display
    a memory; and
    wherein said processor is further configured to load at least some of said service data into memory as part of performing said update operation.

10. The communications device of claim 8, wherein said command serves as said indicator.

11. The communications device of claim 8 wherein said processor is further configured to:
    make an SMS message inbox placement decision based on whether or not said SMS message includes said indicator used to indicate that the message is an update message.

12. The communications device of claim 11,
    wherein said inbox placement decision is a decision on whether or not to include said SMS message in said inbox.

13. The method of claim 8, wherein said cell phone includes a lid in which a display is mounted.

14. The communications device of claim 8, wherein said update operation includes programming a button on said communication device to correspond to a telephone number.

15. The communications device of claim 8, further comprising:
    a display.

* * * * *